(12) United States Patent
Zou

(10) Patent No.: US 9,637,310 B1
(45) Date of Patent: May 2, 2017

(54) MOBILE ROBOT GROUP FOR MOVING AN ITEM

(71) Applicant: Amazon Technologies, Inc., Seattle, WA (US)

(72) Inventor: Le Zou, Cambridge, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/226,400

(22) Filed: Aug. 2, 2016

(51) Int. Cl.
*G06F 7/00* (2006.01)
*B65G 1/137* (2006.01)
*G05D 1/02* (2006.01)

(52) U.S. Cl.
CPC ........... *B65G 1/137* (2013.01); *G05D 1/0297* (2013.01); *G05D 2201/0216* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 9,452,883 B1* | 9/2016 | Wurman | G06Q 10/08 |
| 2008/0167884 A1* | 7/2008 | Mountz | G06Q 10/087 705/29 |
| 2016/0129592 A1* | 5/2016 | Saboo | B25J 9/1661 700/248 |
| 2016/0145044 A1* | 5/2016 | Mountz | B65G 1/1373 700/216 |
| 2016/0271800 A1* | 9/2016 | Stubbs | B25J 9/1666 |

OTHER PUBLICATIONS

Gulec, Nusrettin and Mustafa Unel, "A Novel Coordination Scheme Applied to Nonholonomic Mobile Robots," CDC-ECC '05. 44th IEEE Conference on Decision and Control and the European Control Conference (Dec. 12-15, 2005), 7 pages.

* cited by examiner

*Primary Examiner* — Yolanda Cumbess
(74) *Attorney, Agent, or Firm* — Kilpatrick Townsend & Stockton LLP

(57) ABSTRACT

Techniques for improving the efficiency and flexibility of inventory systems are described. In an example, multiple robots may be operated to move an item. The robots may be allocated to a mobile robot group configured to move the item according to an arrangement of these robots. Tasks for incrementally moving the item and dependencies between the tasks may be generated. Instructions about a first task may be sent to one of the robots. Progress about performing the first task may be received back from the robot. Based on the progress and a dependency from the first task, instructions about a second dependent task may be sent to a second robot. When performed by the respective robots, the first task and the second task may cause an incremental movement of the item by the mobile robot group.

20 Claims, 13 Drawing Sheets

US 9,637,310 B1

MOBILE ROBOT GROUP FOR MOVING AN ITEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related actions become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished actions, and, in general, poor system performance.

To mitigate such challenges, many existing inventory systems have been automated. The automation generally involves a fleet of mobile robots. Each of the mobile robots moves around an inventory space and supports, within the space, a set of inventory-related actions specific to a set of items. The use of mobile robots has improved the efficiency and flexibility while also driving down the overall operational cost of inventory systems.

However, the automation for oversize, overweight, or uniquely shaped items remains a challenge. An existing approach involves developing and deploying relatively larger and/or specialized mobile robots specifically designed to handle such items. This approach incurs a high developmental and operational costs and can result in a loss of efficiency and flexibility when, for instance, the bulkier items are less frequently found in the general item population.

BRIEF DESCRIPTION OF THE DRAWINGS

Various embodiments in accordance with the present disclosure will be described with reference to the drawings, in which.

DETAILED DESCRIPTION

Figure 1:
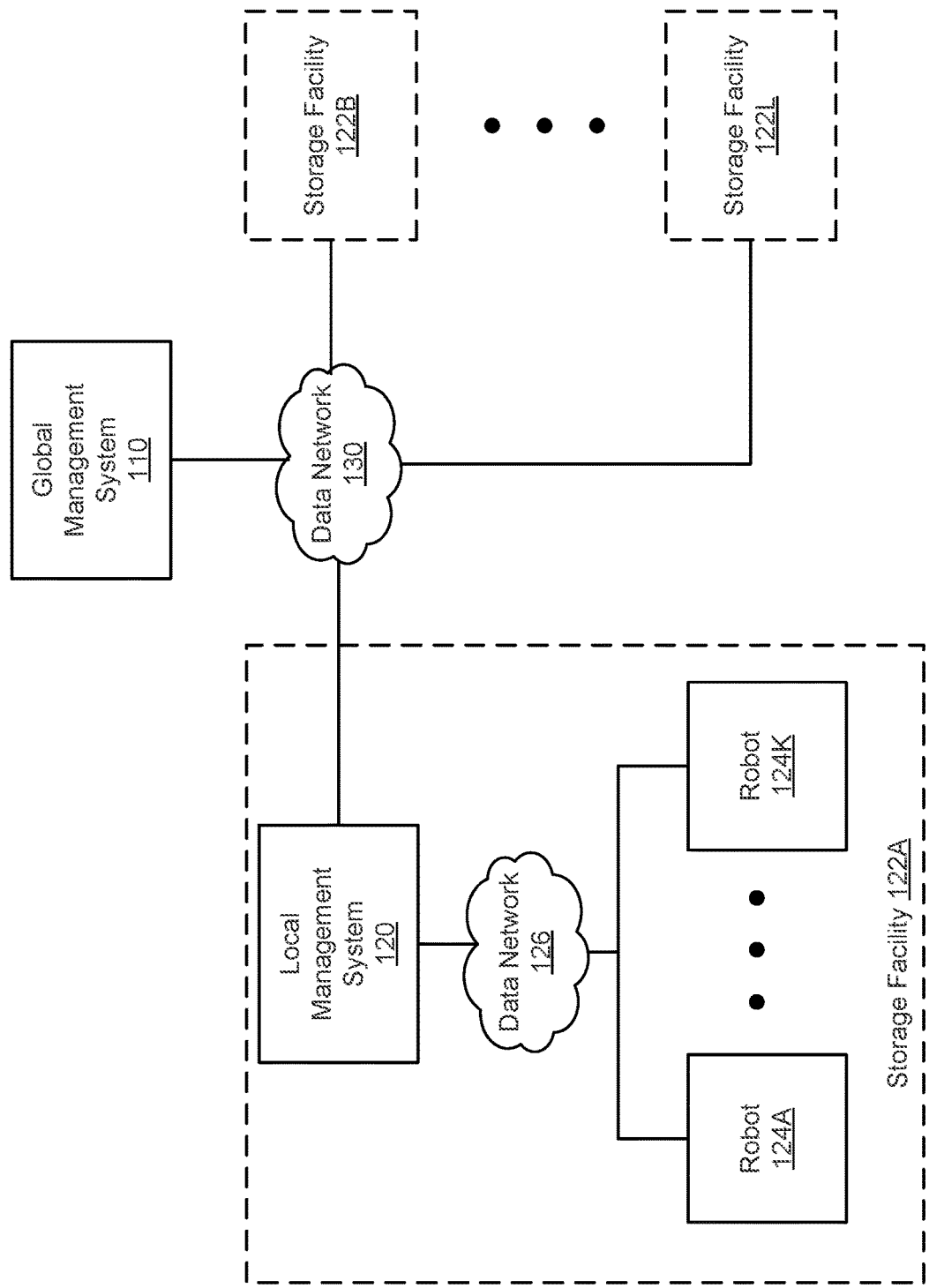
FIG. 1 illustrates an example inventory system suitable for performing inventory-related actions, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, improving the efficiency and flexibility of inventory systems. Specifically, an existing fleet of mobile robots may be used with minimum design change. If a mobile robot can individually handle an item, the mobile robot may be deployed accordingly. Otherwise, if the item is too large, heavy, or uniquely shaped, a mobile robot group may be formed by an arrangement of individual mobile robots. The operations of the mobile robot group may be controlled according to a macro robot movement technique. In macro robot movement, multiple mobile robots may be controlled by a central management system to collaboratively move an oversized, overweight, and/or uniquely shaped item.

Generally, efficiency and flexibility of an inventory system may be enhanced because the existing fleet of mobile robots is used regardless of item dimensions or types. In particular, each mobile robot may be flexibly deployed to handle an item individually or in a mobile robot group. Thus, the overall utilization of mobile robots may be increased. To enable such enhancements, changes to the mobile robots may be made. However, such changes may be minimum and may be limited to, typically, control software of the mobile robots rather than hardware updates.

A mobile robot group may represent a group of mobile robots organized in an arrangement within the group. A mobile robot group implementing macro robot movement may be referred to herein as a "macro robot" for brevity. A mobile robot may represent a robot that may be mobile and can move between locations within a space. A mobile robot may be referred to herein as a "robot" for brevity.

To enable the handling of a single item by a macro robot that includes a swarm of regular-size robots, coordinating the individual movements of the robots to avoid any collision between the robots and/or with obstacles may become critical. Otherwise, severe damage may result, for instance, if the robots are moving together laden with a heavy pallet when one of them stops moving while the rest of the swarm keep moving forward or when one of them collides with an obstacle.

To avoid collision, one approach may attempt to control the robots to start their movement at exactly the same time and move with the same velocity parameters. For instance, a central management system implementing this approach may broadcast long move tasks with timestamps to the robots and wait for completion until broadcasting the next long move tasks. A benefit may involve the use of a small amount of data exchanges via wireless links between the central management system and the robots. However, controlling the time and velocity of the robots may be technically challenging for various reasons. For example, small mechanic component (wheels, motors, etc.) and floor condition differences may prohibit the robots from moving with the same velocity. Given that the robots are typically moving at slightly different speeds, keeping the distances between the robots within certain travel tolerance of the swarm, may necessitate each robot to have its neighbor's current position and velocity. Because wireless links may be used, wireless signal interferences and network congestions can trigger communication loss and delay and some or all of the robots may not also receive positions and velocities of the neighboring robots.

To overcome the above technical challenges while also avoiding collision, techniques for macro robot movement based on space reservation and acceptable relative differences between movements of robots within a macro robot are described herein. In particular, a central management system may reserve a path within a space for long moves of the macro robot. The central management system may also divide the long moves into small movement tasks and generate dependencies between such tasks. The movement tasks are transmitted to the robots according to the dependencies. Each of the movement tasks may fall inside a tolerance of relative differences between the movements of the robots. A dependency may constrain execution of a movement task to meet the tolerance. The central management system may monitor the relative differences at one rate and schedule the transmission of next movement tasks at a lower rate. The use of the larger monitoring rate relative to the transmission rate may enable the central management system to controllably move the macro robot along the reserved path while also ensuring proper individual movements of the robots within the macro robot. These and other features are further described in the next figures.

To illustrate, consider an example of an inventory system deployed within a storage facility. The storage facility may represent a space, where items may be received, handled, packed, unpacked, and sent to delivery vehicles. To facilitate such storage actions, the inventory system may include a central computer system, a fleet of robots, and a data network. An inventory action may be received and request moving a large item, such as a couch, from a source location to a destination location within the storage facility. The central computer system may reserve a path within the storage location for moving the item. The path may specify a physical space and time of occupancy of the physical space. Further, the central computer system may determine that, based on the size, weight, or shape of the item (e.g., the couch), a macro robot should be used and may, accordingly, generate an instance of the macro robot. Thereafter, multiple robots may be allocated to the macro robot in a specific arrangement. The central computer system may break the reserved path into a set of movement tasks and dependencies between the tasks. For instance, each task may be specified for one of the robots and may identify an incremental movement that the robot should perform (e.g., move by a certain distance in a certain orientation at a certain velocity). A dependency between the task and other tasks may be defined. For instance, the dependency may specify that a follower robot should also perform the incremental movement with a higher acceleration and within a certain time period relative to the other task (e.g., in less than one millisecond).

Once the tasks and dependencies are generated, the central computer system may broadcast instructions specifying the tasks over the data network. The broadcast may be sequential and at a particular transmission rate, where the broadcasted instructions may depend on the tasks, the dependencies, and a progress of performing the tasks. For instance, the broadcast may include sending instructions about a first task to a first robot, monitoring at a relatively higher monitoring rate how the first task is performed (e.g., by receiving status reports from the first robot), and, depending on the monitoring and a dependency to a second task, sending instructions about the second task to a second robot, and so on and so forth. In other words, the central computer system may control the sequence and timing of each incremental, small movement for a robot at an individual level, while also accounting for dependencies to incremental, small movements of other robots and how well the other robots perform their respective tasks at a global level. This balancing between individual and global levels may ensure that the macro robot properly progresses along the reserved path and that tolerances of relative differences between movements of the robots are observed.

FIG. 1 illustrates an example inventory system suitable for performing inventory-related actions. An inventory-related action may represent an action associated with inventorying an item, such as to receive, handle, pack, store, unpack, and prepare the item for delivery. Generally, the inventory-related action may include moving the item from one location to another location associated with a storage facility.

As illustrated, the inventory system may include a global management system 110 and a local management system 120 interconnected over a data network 130. The global management system 110 may be configured to manage inventory-related operations across multiple storage facilities 122A-122L. For instance, the global management system 110 may be implemented as a cloud-based computing service or as a dedicated computing hardware within a central location or a data center. In comparison, the local management system 120 may be local to a storage facility 122A. The local management system 120 may be configured to manage inventory-related operations within the storage facility 122A and may be implemented as a cloud-based computing service or a local server. In an example, the local management system 120 may control, fully or partially, certain operations of a fleet of robots 124A-124K located within the storage facility 122A. This control may involve sending instructions to the robots 124A-124K over a data network 126 for execution by the robots 124A-124K. Similar local management systems (not shown in FIG. 1) may exist for other storage facilities 122B-122L.

Each of the robots 124A-124K may be configured to perform an inventory-related action based on instructions received from the local management system 120 over the data network 126. For instance, the robot 124A may individually move an item between locations within the storage facility 122A. Further, for large, heavy, or uniquely shaped item, the robot 124A may occupy a position within an arrangement of a macro robot. Once in position, the robot 124A may receive instructions from and coordinate with the local management system 120 to perform individual movement in concert with individual movements of other robots within the macro robot such that the macro robot, as a whole, may move the bulkier or uniquely shaped item.

The data networks 126 and 130 may include public (e.g., the Internet) or private (e.g., an intranet), wireless or wired communications network that may support one or more communications protocols such as user datagram protocol (UDP) and/or transmission control protocol (TCP). The global management system 110 and the local management system 120 may use such communications network to unicast, broadcast, or multicast instructions and data to and receive instructions and data from various components of the inventory management system including the robots 124A-K.

Although FIG. 1 illustrates a distributed computing environment that includes a hierarchy of two levels, where the global management system 110 sits at one level and the local management system 120 sits at another level, other computing environments may also be possible. For instance, a non-distributed computed environment may be used, where the global management system 110 and the local management system 120 may be integrated. In another illustration, additional hierarchy levels of computing nodes may also be used.

However, the distributed computing environment of FIG. 1 may provide computation benefits. In particular, certain operations of a macro robot and/or individual robots may be time critical, while other operations may not be. As such, the global management system 110 may be configured to manage non-critical operations of the macro robot. These operations may include, for example, determining an arrangement of the macro robot, generating an instance of the macro robot, and/or assigning individual robots to the macro robot. On the other hand, the local management system 120 may be configured to manage time-critical operations of the macro-robot and individual robots. These operations may relate to controlling the macro movement of the macro robot and the individual movements of the robots. For example the local management system 120 may be configured to reserve a space for the macro robot, monitoring progress of the macro robot along the space, and controlling interactions of the macro robot with outside obstacles (e.g., objects, other robots, and/or other macro robots in the storage facility 122A). Additionally, the local management system 120 may be configured to coordinate, instruct, and monitor individual movements of the robots.

By distributing the managements of operations between two computing levels, the utilization of underlying computing resources and the response time may be improved. On one hand, non-time critical operations may be controlled at a global level. Processing and data communications related to such operations need not occur at a high rate, thereby improving utilization of processors, memories, and network bandwidth. On the other hand, time-critical operations may be controlled within a local environment best suited for such operations, thereby improving the response time.

While the operations of the macro robot and each individual robot may be time critical, those of the individual robots may necessitate a higher degree of coordination and, thus, higher processing and communication rates. Accordingly, the management of the local operations may be further distributed across multiple hierarchical sub-levels within the local management system 120. Each sub-level may support a desired rate of coordination. In an example, the operations of the macro robot may be controlled at one computing node (or a number of computing nodes at a hierarchy sub-level). In comparison, the operations of the individual robots may be controlled at another computing node (or another number of computing nodes at a different hierarchy sub-level) suitable for processing and communicating data related to these operations at a relatively higher rate.

By distributing the time critical operations between two computing levels, the utilization of underlying computing resources and the response time may be further improved. On one hand, the manipulation of the space within the macro robot (e.g., of the internal space by constraining individual movements of the robots) may be independent of the interaction of the macro robot with the space external to the macro robot (e.g., with the external space). On the other hand, the management of the internal space may necessitate monitoring and coordination at a much higher frequency than that for managing the external space. Hence, by allocating the external space management to one computing node and the internal space management to one or more other computing nodes, a more efficient computational balance may be achieved. In addition, by localizing the internal space management to a larger number or more computationally capable nodes, a much faster response time may be achieved with respect to coordinating the individual movements of the robots.

Figure 2:
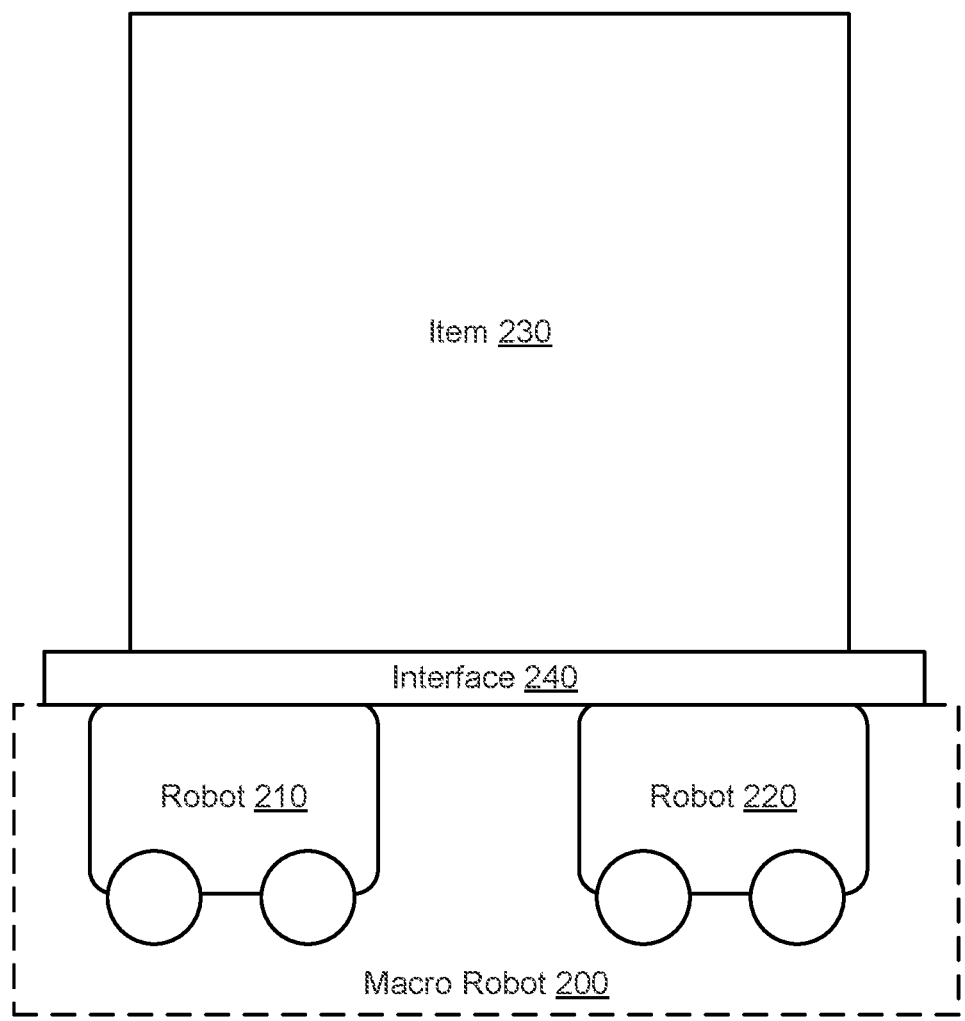
FIG. 2 illustrates an example of a macro robot formed by a number of robots, according to an embodiment of the present disclosure.

FIG. 2 illustrates an example of a macro robot 200 formed by a number of robots. Although two robots 210 and 220 are shown, the macro robot 200 may include a larger number of robots. Generally, the robots 210 and 220 are positioned at different locations within an internal space of the macro robot 200 to form an arrangement for moving an item 230. An interface 240, such as a docking head, a pallet, or some other retainer, may also be used for retaining the item 230 by the macro robot 200. FIG. 2 illustrates a linear, horizontal arrangement. Other arrangements may also be possible and may depend on the type of inventory-related action, the item 230, and/or the type(s) of the robots 210 and 220. As the macro robot 200 moves, the relative positions between the robots 210 and 220 may be maintained within an acceptable tolerance.

In an example, a computer system, such as any or a combination of the global management system 110 and local management system 112 of FIG. 1, may generate an instance for the macro robot 200. The instance may include a unique identifier of the macro robot 200. The same or another computer system may allocate the robots 210 and 220 to the instance. The allocation may include assigning the robots 210 and 220 to the instance and instructing the robots 210 and 220 to form the arrangement.

For example, the computer system may maintain a status mapping between robot identifiers to robot statuses. An identifier of a robot may uniquely identify the robot. A status of the robot may indicate whether the robot is available, allocated to a macro robot, performing an inventory-related action, or scheduled to perform an inventory-related action. In addition, the computer system may maintain an arrangement mapping between item identifiers, inventory-related actions, and arrangements. This mapping may accordingly specify an arrangement of a macro robot for performing an inventory-related action on an item. The arrangement may include the number, types, and/or relative positions of the robots within the macro robot.

Hence, based on an identifier of the item 230 and the applicable inventory-related action, the computer system may use the two mappings to determine the arrangement of the macro robot 200 and the availability of the two robots 210 and 220. Accordingly, the computer system may allocate the robots 210 and 220 to the instance of the macro robot 200.

Once allocated, the computer system may also generate the tasks that each of the robots 210 and 220 should perform and the dependencies between the tasks. Each task may describe an individual movement of a robot, such as a translational or rotational movement by a certain distance and/or in a certain orientation. A dependency may condition the performance of a task to the performance of one or more other tasks. Further, the computer system may assign the tasks to the robots 210 and 220 based on the dependencies. For example, the computer system may maintain a mapping that assigns each task to a robot identifier and a sequence, conditions, and timings for sending the tasks to the robots 210 and 220.

In an example, assigning the tasks based on the dependencies may include setting one of the robots 210 and 220 as a leader robot (referred to herein as a "leader" for brevity) and the other robot 210 or 220 as a follower robot (referred to herein as a "follower" for brevity). Generally, a leader may represent a robot that may initiate or perform a task assigned thereto, where one or more subsequent tasks may depend on the task. Conversely, a follower may represent a robot that may initiate or perform a task assigned thereto, where the task may depend from another task assigned to a leader. To illustrate, if the item 230 should be moved from left to right, the computer system may assign the robot 220 as the leader and the robot 210 as the follower. In this illustration, the robot 220 may start the movement to the right, and the robot 210 may follow. The computer system may instruct the leader 220 to perform a first task (e.g., to move by a certain distance to the left) and, dependently on this first task, instruct the follower 210 to perform a second task (e.g. move by an equivalent distance shortly after the leader 220 started moving by performing the first task), and so and so forth until the item 230 is moved to a destination location.

Figure 3:
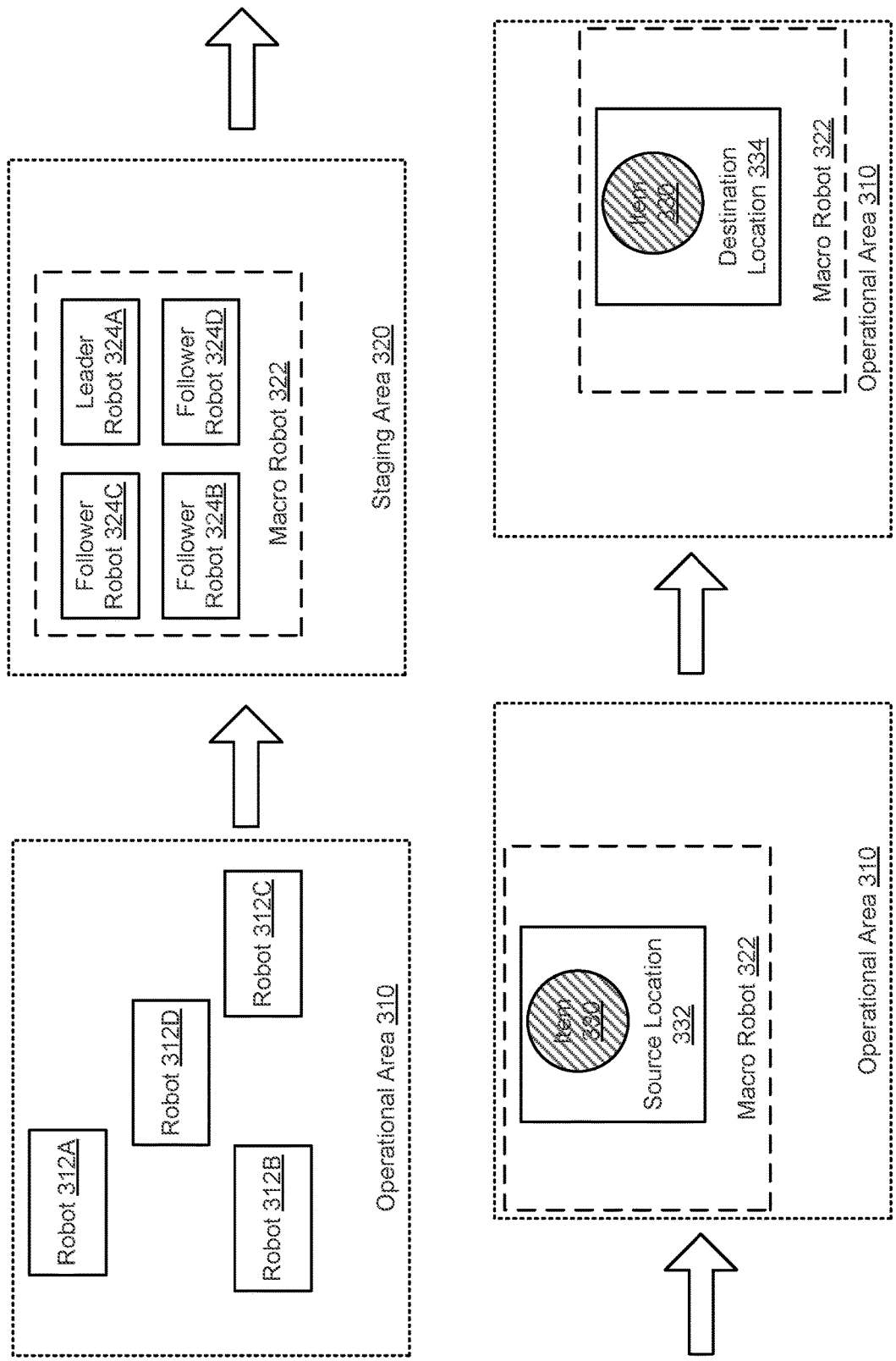
FIG. 3 illustrates an example environment for staging robots to form a macro robot and for operating the macro robot, according to an embodiment of the present disclosure.

FIG. 3 illustrates an example environment for staging robots to form a macro robot and for operating the macro robot. The environment may include an operational area 310 and a staging area 320. A number of robots 312A-312D may be scattered across the operational area 310, each performing an inventory-related action individually or being in an idle state waiting for instructions. Based on an inventory action that necessitates a macro robot 322, a computer system may allocate the robots 312A-312D to an instance of the macro robot 322. The computer system may instruct the robots 312A-312D to move to the stating area 320 to form an arrangement within the macro robot 322. Accordingly, each of the robots 312A-312D may move from its current location in the operational area 310 to a specific location in the staging area 320. A specific location of a robot may correspond to a position of the robot within the arrangement of the macro robot 322.

In an example, the staging area 320 may be configured for high resolution positioning of the robots 312A-312D. For instance, the staging area 320 may include a high resolution grid (e.g., ranging between a meter to a millimeter resolution). The grid may be printed on or mounted to the floor or another location of the staging area 320, set up via a grid of sensors (e.g., infrared sensors), or effectuated via wireless, positioning, and/or optical sensors. The computer system may provide a specific location to each of the robots 312A-312D. In turn, each of the robots 312A-312D may sense on its own, and/or may communicate with the computer system to determine, its position relative to the high resolution grid such that it can properly move to the specific location.

Once in place, the computer system may set one of the robots as a leader and the remaining robots as followers. As illustrated in FIG. 3, the robot 312A is set as the leader 324A, while the remaining robots 312B-312D are set as followers 324B-324D.

In addition, the arrangement of the robots leader 324A and followers 324B-324D may occupy a space. That space may represent an internal space of the macro robot 322 and is shown in FIG. 3 with a dashed perimeter line. The computer system may set the global movement of the macro robot 322 and the individual movements of the leader 324A and followers 324B-324D to observe particular tolerances relative to the space.

Different types of tolerances may be defined. One example may include an external tolerance that relates to the interaction of the macro robot 322 with the external space (e.g., the space outside of the perimeter defined by the arrangement of the macro robot 322). For instance, the macro robot 322 may not move closer than twenty-five millimeter (or some other distance) to any other obstacle (e.g., object, robots, or other macro robots) within the operational area 310. This external tolerance may be used to reserve a path for the macro robot 322 and to monitor and correct any deviation from the reserved path.

Another example may include an internal tolerance that relates to the individual movements of the leader 324A and followers 324B-324D within the internal space of the macro robot 322 and relative to each other. The internal tolerance may be used to control the individual movements of the leader 324A and followers 324B-324D within the arrangement of the macro robot 322. In an example, the internal tolerance may be expressed as a space tolerance and a time tolerance.

A space tolerance may set a limit on a deviation for a robot from the arrangement of the macro robot 322 or, equivalently, for a difference between a distance of the robot relative to another robot in the arrangement. Different techniques may be used to express this space tolerance. In one example technique, the space tolerance may be defined per robot. For instance, the space tolerance may limit any individual movement per task and per robot to be less than twenty-five millimeters. In another example technique, the space tolerance may be defined based on relative movement of two or more robots. In this technique, the space tolerance may set an upper and lower range to limit the relative traveled distance (e.g., a distance gap) between two robots. For instance, the space tolerance may specify that the distance gap should not increase by more than twenty millimeters and may not decrease by more than ten millimeters. Hence, if fifteen millimeter gap exists between the leader 324A and the follower 324C and if the leader 324A moves by twenty-five millimeters, the follower 324C should also move by at least twenty millimeters (to keep the gap distance to less than the upper limit of twenty millimeters) and not more than thirty millimeters (to keep the gap distance to greater than the lower limit of ten millimeters).

In comparison, a time tolerance may set a limit on a response time for a robot relative to a movement of another robot in the arrangement. For instance, the time tolerance may specify that, once a robot starts moving, another robot should start moving relatively within less than one millisecond (or some other time period). Hence, if the leader 324A starts moving at time "$t_0$," the follower 324C should start moving within time "$t_0+1$ millisecond."

In an example, the resolutions of the internal and external tolerances may be based on the capabilities of the computer system and the robots 312A-312D. In particular, any space tolerance may depend on the configuration of the system, as a whole, to detect movements and accurately measure traveled distances. Similarly, any time tolerance may depend on the configuration of the system, as a whole, to timely respond to detected movements.

Once the tolerances are defined, the tasks and dependencies between the tasks may be generated to account for these tolerances. For instance, the computer system may break a large movement into small individual movements, each corresponding to a task, and may set the sequence, conditions, and timings to perform the tasks to meet the tolerances. The dependencies may store the sequence, conditions, and/or timings.

As further illustrated in FIG. 3, the macro robot 322 may leave the staging area 320 and enter the operational 310. In particular, the macro robot 322 may travel, along a reserved path, to pick an item 330 up from a source location 332 in the operational area 310 and move the item 330 to a destination location 334 also in the operational area 310. Once the inventory-related action is complete (e.g., the item 330 moved to the destination location 334), the computer system may de-allocate the leader 324A and followers 324B-324D from the macro robot 322 and may terminate the instance of the macro robot 322 (e.g., delete the instance or mark the instance as having a complete status). Once de-allocated, the leader 324A and followers 324B-324D, or equivalently the robots 312A-312D, may become available again to perform other inventory-related actions.

Figure 4:
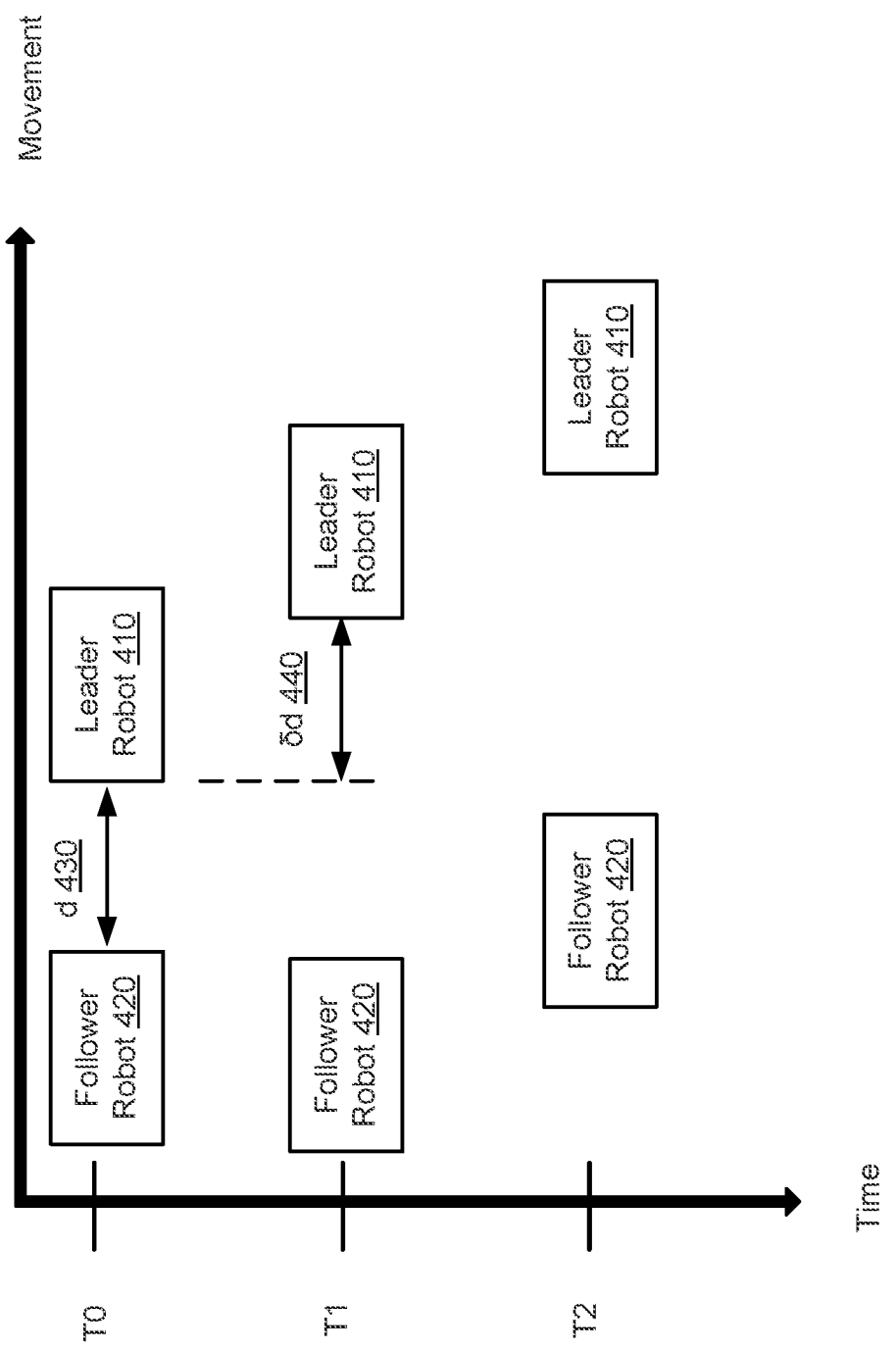
FIG. 4 illustrates an example of a pattern for individual movements of a leader and a follower within a macro robot, according to an embodiment of the present disclosure.

FIG. 4 illustrates an example of a pattern for individual movements of a leader 410 and a follower 420 within a macro robot. The pattern is illustrated relative to the horizontal axis representing movement and the vertical axis representing time. A computer system may generate tasks and dependencies between the tasks to control the movement pattern according to tolerances. For instance, each task may define an individual movement that may not exceed a space tolerance of twenty-five millimeter (or some other value). A child task may specify that an individual movement should commence within one millisecond (or some other value) relative to the individual movement of a parent task.

At time "$t_0$," the two robots 410 and 420 are in the arrangement of the macro robot. In the arrangement, a distance "d" 430 may separate the two robots 410 and 420. The computer system may send to the leader 410 instructions corresponding to a first task to initiate movement of the leader 410. The leader 410 may respond accordingly by executing the instructions and may start moving. While moving, the leader 410 may report its new position to the computer system at a high frequency.

At time "$t_1$," the leader may have traveled by a relative distance "δd" 440 releasing a space of "δd" 440, while the follower 420 may have not started moving. Because the released space is no longer occupied by the leader 410, that space no longer needs to be reserved for the leader 410 and can be reserved for the follower 420 instead. While "δd" 440 is within an acceptable tolerance (e.g., twenty-five millimeters), the computer system may send to the follower 420 instructions corresponding to a second task to initiate movement of the leader 410 into the released space (now reserved for the follower 420). These instructions may be sent to the follower within a time tolerance (e.g., in less than one millisecond). The follower 420 may respond accordingly by executing the instructions, start moving, and reporting its new position to the computer system at a high frequency.

Accordingly, at time "$t_2$," both the leader 410 and follower 420 may have moved, where each of the individual movements fall within the defined tolerances. The process of instructing the leader 410 and 420 may be repeated such that the macro robot moves over time.

The relative accelerations and decelerations of the leader 410 and follower 420 may contribute to how well the overall movement of the macro robot is performed. In particular, at time "$t_0$," the leader 410 may have initiated its movement at a first acceleration "$a_1$." In comparison, at time "$t_1$," the follower 420 may have initiated its movement at a second acceleration "$a_2$." Because of the time difference "$t_1-t_0$," a distance gap may have been created (e.g., corresponding to "δd" 440). To minimize this gap to an acceptable minimum (e.g., down to a space tolerance of twenty-five millimeters to avoid any collision between the two robots), the computer system may instruct the follower 420 to use a higher acceleration "$a_2$" relatively to the acceleration "$a_1$." Thereafter, the velocity of the two robots may remain about the same (e.g., the cruising speed may be almost constant), and the acceleration may no longer be a factor. The distance gap would, thus, remain relatively constant. However, if the cruise speed changes or, if the computer system detects a change (e.g., an increase or decrease) to the distance gap over time, the leader 410 and follower 420 may be instructed to adjust their respective accelerations.

As far as deceleration, sending the respective instructions to the leader 410 and follower 420 before each starts decelerating may improve the efficiency of the macro robot. In particular, if the leader 410 (and, similarly, the follower 420) decelerates after completing a task and before receiving instructions about the next task, the leader 410 would need to accelerate again once the instructions are received. In this case, the back and forth deceleration and acceleration may shorten the battery life of the leader, consumer higher energy, and use a longer time to complete the overall macro movement. In comparison, sending the next instructions prior to deceleration may ensure that the leader (and, similarly, the follower 420) maintains its cruising speed.

Figure 5:
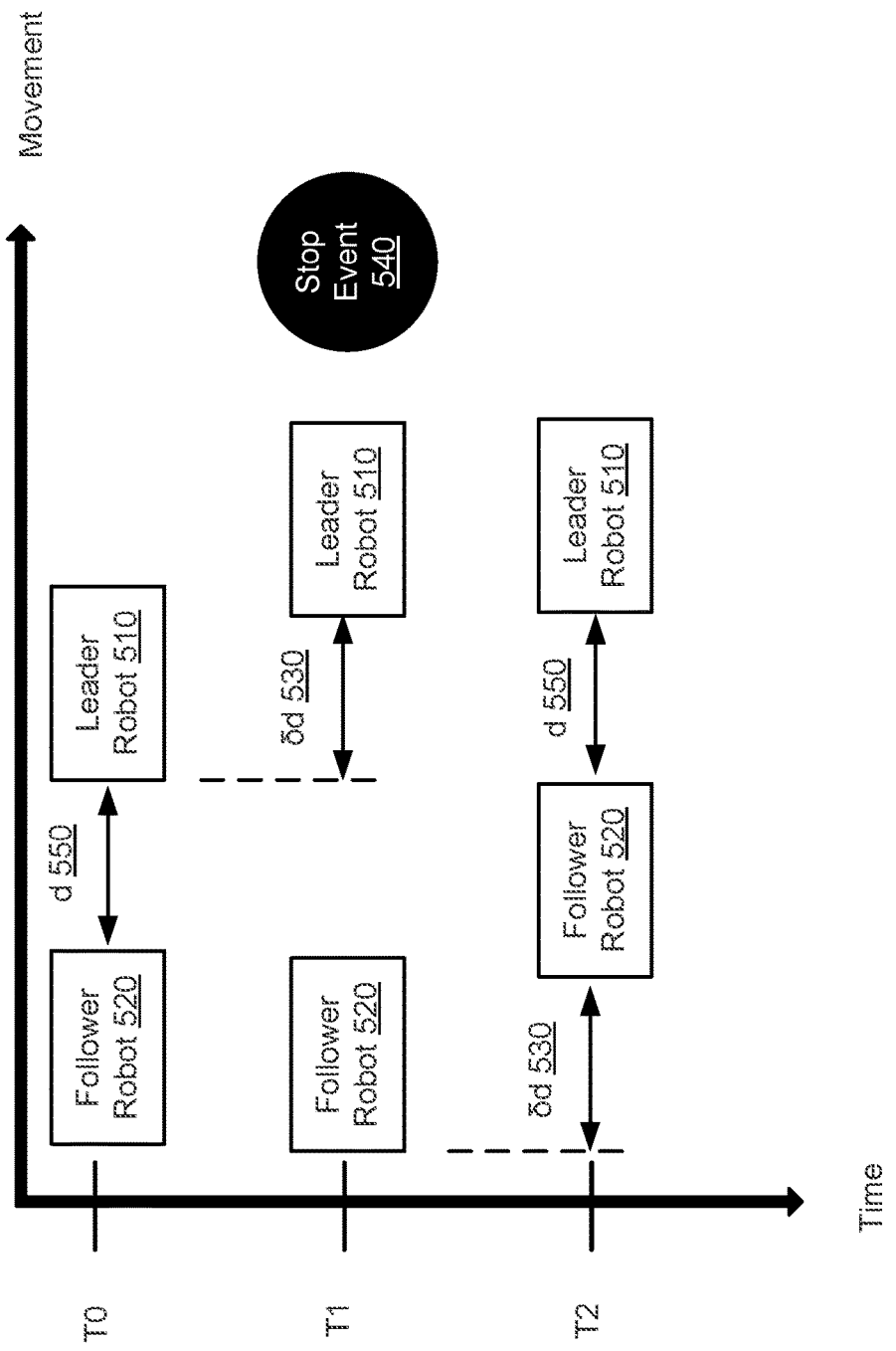
FIG. 5 illustrates an example update to a movement pattern based on a task status of a leader, according to an embodiment of the present disclosure.

FIG. 5 illustrates an example update to a movement pattern based on a task status of a leader. Similar to FIG. 4, a leader 510 and a follower 520 may form an arrangement of a macro robot at time "$t_0$." Based on instructions from a computer system, the leader 510 may start moving and travel by a relative distance "δd" 530 in a direction, thereby releasing previously occupied space (e.g., an equivalent distance in the opposite direction). However, at time "$t_1$," the leader 510 may encounter a stop event 540. The stop event 540 may represent an obstacle, a loss of communication with the computer system, or a delay of the communication. Hence, the leader 510 may stop its movement automatically or based on specific instructions from the computer system (e.g., if there was an obstacle but not a communication loss or delay). A status of the task corresponding to the leader's 510 movement may be updated to "stop" or some other value. Because a space has been released, the follower 520 may start its movement to occupy the released space. Thus, by time "$t_2$," the follower 520 may have moved by the relative distance "δd" 530. If at that time, the leader 510 has not moved again, the follower 520 may stop its movement. By stopping the movement of the follower 520, the computer system may ensure that the distance "d" 550 between the leader 510 and the follower 520 may remain within an acceptable tolerance, thereby avoiding collision between the two robots.

Figure 6:
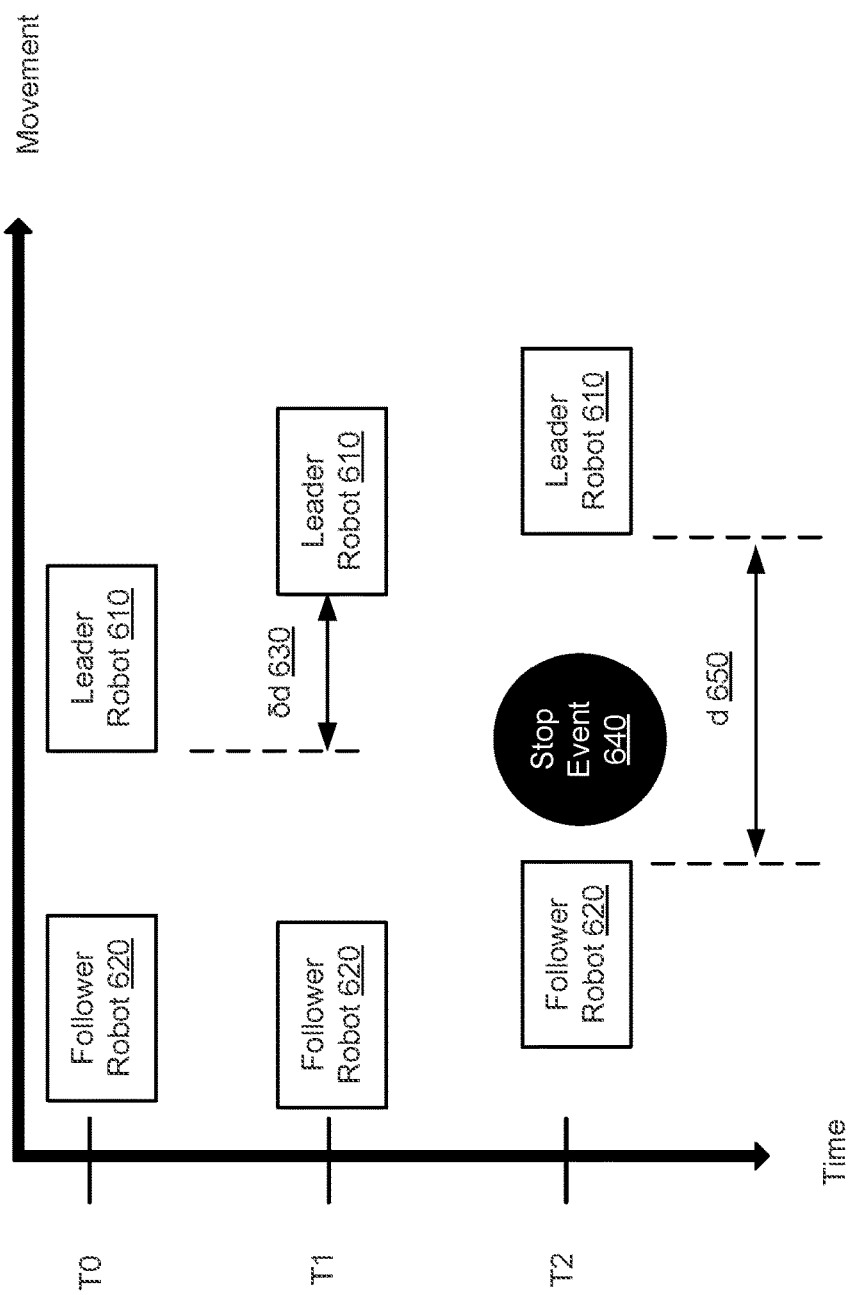
FIG. 6 illustrates an example update to a movement pattern based on a task status of a follower, according to an embodiment of the present disclosure.

FIG. 6 illustrates an example update to a movement pattern based on a task status of a follower. Similar to FIG. 4, a leader 610 and a follower 620 may form an arrangement of a macro robot at time "$t_0$." Based on instructions from a computer system, the leader 610 may start moving and travel by a relative distance "δd" 630 in a direction at time "$t_1$," thereby releasing previously occupied space. The follower 620 may start following the leader 610 by moving into the released space.

However, at time "$t_2$," the follower may encounter a stop event 640. Hence, the follower 620 may stop its movement automatically or based on specific instructions from the computer system. A status of the task corresponding to the follower's 620 movement may be updated to "stop" or some other value. To avoid movement of the leader 610 that would result in a distance "d" 650 between the two robots in excess of a tolerance, the computer system may instruct the leader 610 to stop its movement.

As illustrated in FIGS. 4-6, the computer system may send instructions to the robots to perform certain tasks based on dependencies between the tasks, monitor progress of performing the tasks, and update these instructions based on the monitoring. In an example, instructions about a task may describe a task (e.g., move by a certain distance in a certain orientation, at a certain acceleration and/or velocity). The sequence and timings of sending the instructions may depend on the dependencies between the tasks (e.g., instructions about a leader's task should be sent before instructions about a follower's task), tolerances (e.g., the relative timing between two instruction sets should be less than one millisecond), and monitored progress or conditions (e.g., whether a stop event may have been encountered, whether performing a task is releasing space, etc.). Accordingly, the computer system may control the individual movements of each of the robots within an arrangement of a macro robot such that the macro robot, as a whole, may properly move along a path.

FIGS. 7-10 illustrate example flows for allocating robots to a macro robot according to a particular arrangement and controlling the individual movements of the robots within the arrangement. In the example flows, some of the operations may be embodied in, and fully or partially automated by, components executed by one or more processors. In addition, while the operations are illustrated in a particular order, it should be understood that no particular order is necessary and that one or more operations may be omitted, skipped, and/or reordered.

Figure 7:
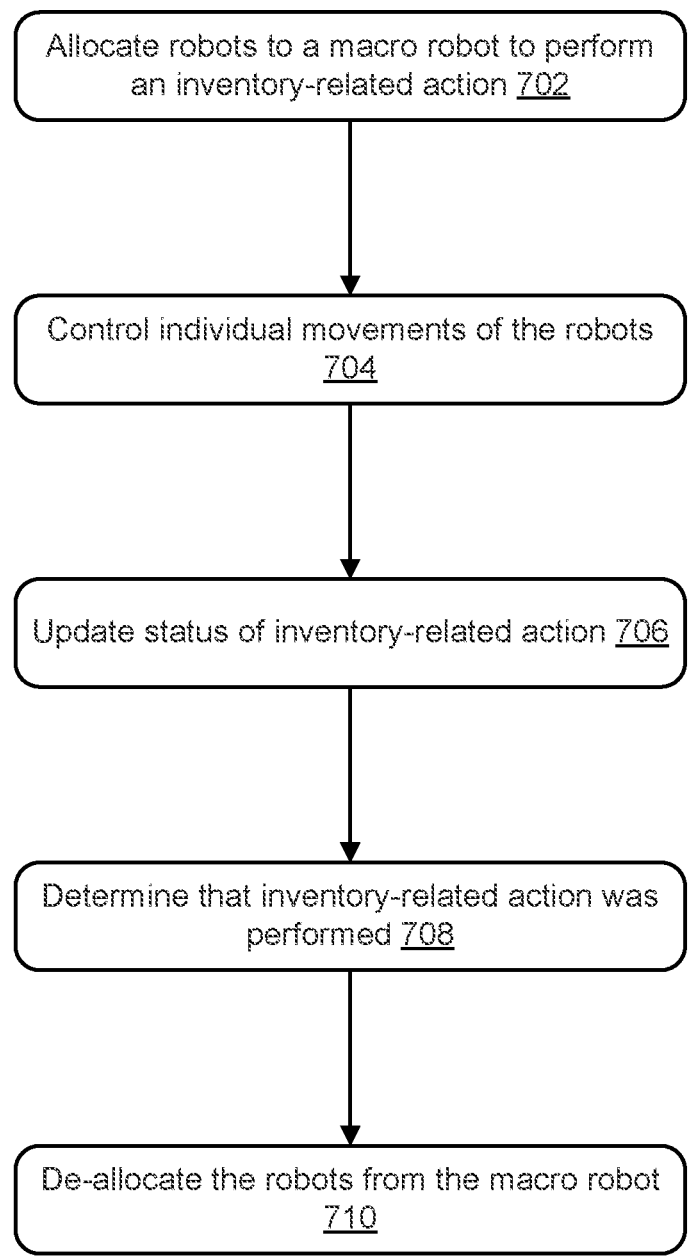
FIG. 7 illustrates an example flow for using a macro robot to perform an inventory-related action, according to an embodiment of the present disclosure.

FIG. 7 illustrates an example flow for using a macro robot to perform an inventory-related action on an item within a storage facility. A computer system is illustrated as performing the operations. In an example, the computer system may include a global management system and a local management system.

The example flow may start at operation 702, where the computer system may allocate robots to the macro robot. For example, the global management system may generate an instance of the macro robot. In turn, the global management system and/or the local management system may identify the number, type, and arrangement of robots to form the macro robot based on the inventory-related action, the item, and statuses of the robots. Once identified, the local management system may instruct the robot to move into positions to form the arrangement.

At operation 704, the computer system may control the individual movements of the robots. For example, the local management system may reserve a path for the macro robot within the storage facility based on the inventory-related action, other scheduled inventory-related actions, location of the item, and other obstacles within the storage facility. The local management system may also break the path into a set of small movements and generate tasks for each small movement and dependencies between the tasks. The local management system may send instructions about the tasks to the robots corresponding to the tasks, monitor the performances, and update the instructions as applicable.

At operation 706, the computer system may update a status associated with the inventory-related action. For example, the local management system may monitor the progress (e.g., positions, traveled distances and directions, what tasks have been performed, what tasks remain, etc.) of the individual movements of the robots based on reports from these robots. The individual reports may be received at a particular frequency. At a smaller frequency, the local management system may determine a global status of the macro robot (e.g., has moved by a certain distance, has been at a certain location for a period of time) based on these individual reports, and may report the global status to the global management system. The global status may show the progress of performing the inventory-related action and may be published to a user interface.

At operation 708, the computer system may determine that the inventory-related action was performed. For example, the global management system and/or the local management system may make that determination by comparing the last global status to parameters of the inventory-related action. As such, if the inventory-related action specifies a destination location and if the global status indicates that item was moved to that location, completion may be assumed.

At operation 710, the computer system may de-allocate the robots from the macro-robot based on the completion. For example, the local management system may instruct the robots to break the arrangement and move to other areas and/or perform other tasks. In turn, the global management system may delete the instance of the macro robot or may update a status of the instance as complete.

Figure 8:
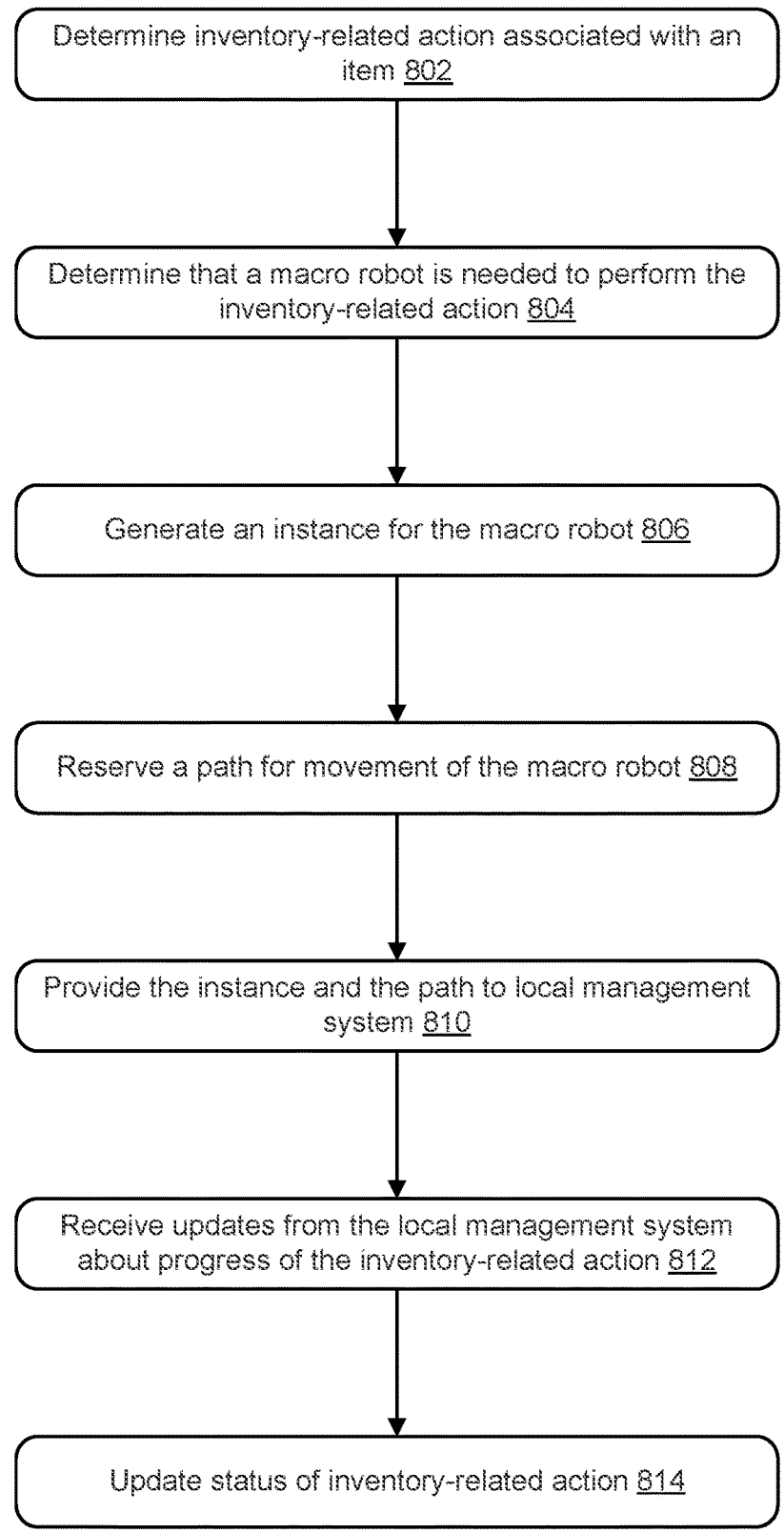
FIG. 8 illustrates an example flow for managing a macro robot, according to an embodiment of the present disclosure.

FIG. 8 illustrates an example flow for managing a macro robot. A global management system is illustrated as performing the illustrative operations. Nonetheless, other computer systems may similarly perform these operations.

The example flow of FIG. 8 may start at operation 802, where the global management system may determine an inventory-related action associated with an item to be performed within a storage facility. For example, the global management system may interface with a computing component, such as another computer system or database, of an inventory system. The computing component may store information about different inventory-related actions that should be performed on different items. Accordingly, the global management system may receive particular information about the inventory-related action and about the item from the computing component over the interface.

At operation 804, the global management system may determine that a macro robot is needed to perform the inventory-management system. For example, the global management system may store or remotely access a mapping that specifies types of robots per inventory-action and per item. Based on the information about the inventory-related action and about the item, a determination may be made from the mapping for the need of the macro robot.

At operation 806, the global management system may generate an instance of the macro robot. For example, the instance may include a unique identifier of the macro robot. In addition, the instance may include a unique identifier or a description about the type of the macro robot, the desired arrangement of robots within the macro robot, and/or the desired capabilities of the macro robot (e.g., capable of moving a certain weight, shape, size or type of items by a certain distance).

At operation 808, the global management system may reserve a path for movement of the macro robot within the storage facility. For instance, based on the arrangement, the global management system may determine dimensions of the macro robot and external tolerances, and start and end destinations of the inventory-related actions. The global management system may balance these parameters other scheduled inventory-related actions and obstacles within the storage space to generate and reserve the path.

At operation 810, the global management system may provide the instance and the path to a local management system, along with information about the item. For example, the global management system may send the instance and information about the path to the local management system over a data. Once received, the local management system may allocate robots to the instance and may control the individual movements of these robots such that the macro robot progresses along the path.

At operation 812, the global management system may receive updates from the local management system about progress of the inventory-related actions. For example, the global management system may receive global statuses at a particular rate over the data network.

At operation 814, the global management system may update the status of the inventory-related action based on the received updates. For example, the global management system may publish a global status to a user interface when the global status is received or changes over a previous status.

Figure 9:
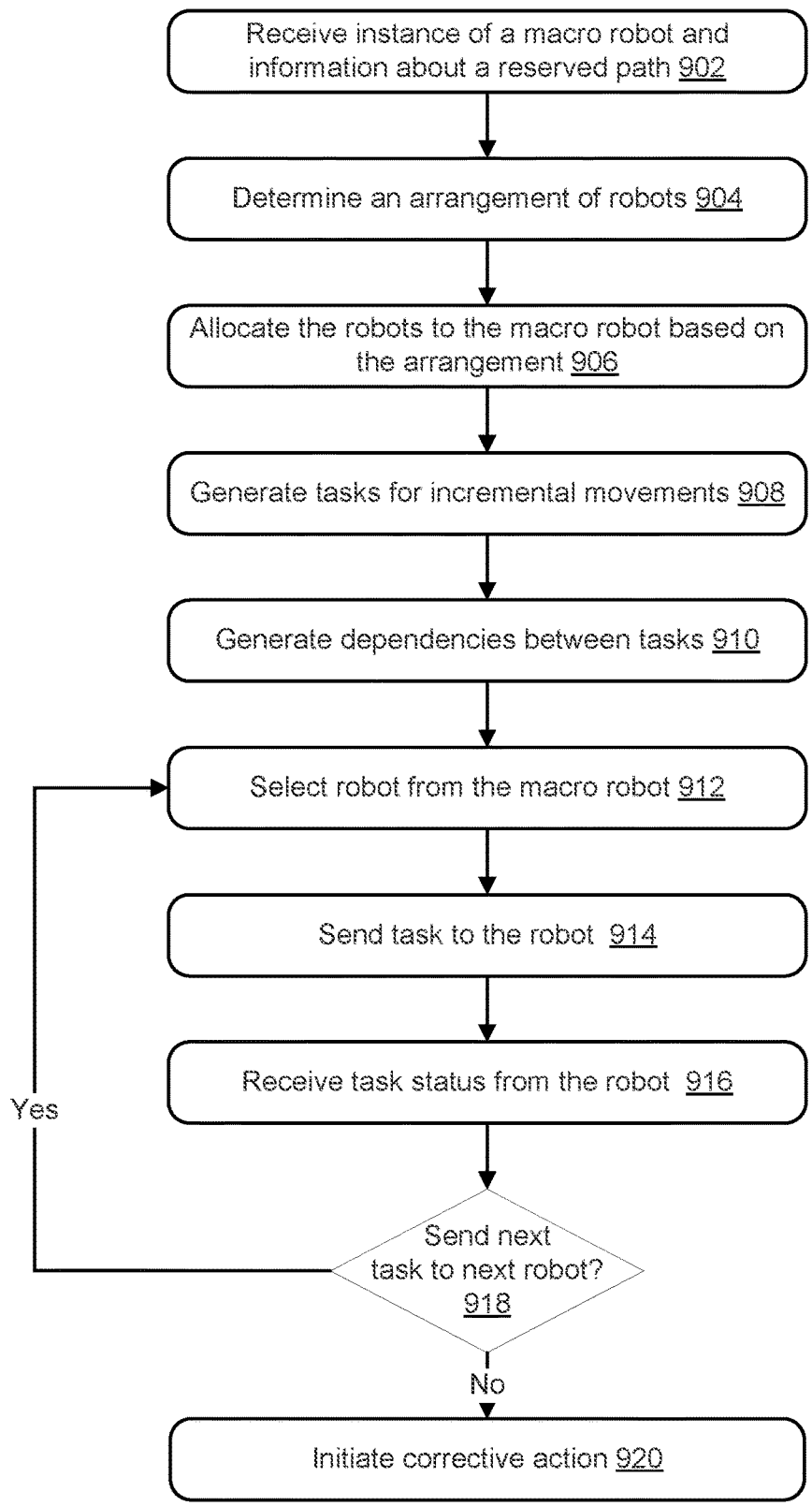
FIG. 9 illustrates an example flow for managing a robot within an arrangement of a macro robot, according to an embodiment of the present disclosure.

FIG. 9 illustrates an example flow for managing a robot within an arrangement of a macro robot. A local management system is illustrated as performing the illustrative operations. Nonetheless, other computer systems may similarly perform these operations.

The example flow of FIG. 9 may start at operation 902, where the local management system may receive an instance of the macro robot, information about a reserved path, and/or information about an item. For example, the local management system may receive such data from a global management system over a data network. In an example, the instance may identify the macro robot, a type of the macro robot. In another example, the instance may further describe a desired arrangement of the macro robot, parameters of an inventory-related action, an identifier of the item, and/or dimensions of the item.

At operation 904, the local management system may determine an arrangement of the robots from the received instance and information. For example, the local management system may, depending on the received information, store or remotely access an arrangement mapping to identify the desired arrangement. The arrangement mapping may map item identifiers, inventory-related actions, and arrangements. The desired arrangement may specify various parameters that relate to the robots, such as the number, positions within the macro robot, and capabilities (e.g., size, lift capability, battery life, velocity, etc.) of the robots. In addition, the local management system may access a status mapping that identifies robots and statuses thereof (e.g., availabilities, battery life, etc.). Based on the specified parameters and statuses, the local management system may select a certain set of robots.

At operation 906, the local management system may allocate the robots to the macro robot based on the arrangement. For example, the local management system may update the status of each of the selected robots as being allocated to the instance. In addition, the local management system may instruct the selected robots to move to the respective positions within the arrangement. This may include, in an example, instructing the robots to move to a staging area to form the arrangement at a high accuracy.

At operation 908, the local management system may generate tasks for incremental movements. In an example and depending on the information received at operation 902, the local management system may generate and/or reserve path within a storage facility by balancing current and scheduled operations of other robots with those of the macro robot given a set of obstacles. The reserved path may include movement over time of the macro robot within the facility. Further, the local management system may split the reserved path into a set of small paths. Within each small path, the local management system may identify an incremental movement such that the totality of the incremental movements may form the movement of the macro robot along the reserved path. For each of the incremental movements, the local management system may define a task per robot that, when performed by the robot, would contribute to the incremental movement. For instance, the task may define an individual movement that the robot may perform in a certain direction, at a certain velocity, and for a certain distance. The task may be defined based on the incremental movement and the position of the robot within the arrangement and may be constrained by external and internal tolerances of the macro robot.

At operation 910, the local management system may generate dependencies between the tasks. For example, the dependencies may specify a sequence, timings, and conditions to perform certain tasks and may identify a leader and robots within the arrangement to perform these tasks. The local management system may generate the dependency of a task on another task based on how the two tasks relates and the external and internal tolerances. In an example, the local management system may maintain a task mapping that may identify tasks, dependencies, associations to robots, and task statuses.

At operation 912, the local management system may select a robot from the macro robot. For example, the selection may be based on what tasks have been performed, what task needs to be performed next, and the dependencies as maintained in the task mapping. To initiate the movement of the macro robot, the local management system may select the leader. Thereafter, the local management system may select a follower. Once the macro robot is in motion at, for instance, cruise speed, the local management system may switch between selecting the leader or a follower based on the task mapping. If a stop event is encountered, the local management system may update the task mapping and select an appropriate robot (e.g., one that should stop movement).

At operation 914, the local management system may send a task to the selected robot. For example, the local management system may identify the task from the task mapping given the selected robot. Sending the task may include sending instructions about the task to the robot over a data network. In an example, sending the instructions may be subject to time constraints. For instance, the selected robot should be instructed within a certain time tolerance (e.g., one millisecond) relative to the last instructions sent to another robot. In another illustration, the selected robot should receive the instructions prior to decelerating.

At operation 916, the local management system may receive a task status from the selected robot. For instance, sending the task may performed at a certain transmission rate. In comparison, the robot may report its status back to the computer system at a higher monitoring rate over the data network. The reported status may identify the task, the new position of the robot, traveled distance and direction, any encountered obstacle, and/or any other parameters related with performing the task.

At operation 918, the local management system may determine whether to send a next task to a next robot. If so, the local management system may perform the operation 912 to select the next robot given the current selected robot and the current task dependencies from the current task as identified in the task mapping. Otherwise, the local management system may perform operation 920. The determination at operation 918 may depend on the reported task status. For instance, if the task status indicates proper progress, the local management system may select and instruct the next robot. On the other hand, if the task status indicates a failure of performing the task or a number failed attempts of performing the task, a corrective action may be initiated At operation 920, the local management system may initiate the corrective action. Various corrective actions may be possible including, for example re-performing the last task, re-performing a subset of previously performed tasks across multiple robots based on the dependencies between these tasks, stopping the performance of the inventory-related action and restarting (e.g., moving the item to a ground position, lifting the item again from the ground position, and restarting the movement), and/or forming a new arrangement for the macro robot (e.g., re-positioning the existing robots, or de-allocating some or all of the existing robots and allocating a new robot(s)). The local management system may select an appropriate corrective action based on the task status, along with tasks statuses of other robots, and instruct the affected robot(s) to perform the corrective action. For example, if an obstacle is encountered or a communication loss or delay has occurred, the corrective action may stop movement of a robot, while allowing certain movements of other robots until the obstacle is avoided or the communication properly re-established. In another example, if task statuses indicate a lack of progress across multiple robots, the robots may be instructed to stop and restart the movement. In yet another example, if a corrective action is attempted a number of times but failure persists, a second corrective action may be initiated, where this second corrective action may include stopping the movement and forming a new arrangement of robots.

In an example the operations of the example flow of FIG. 9 may be distributed between different computing nodes of the local management system to improve the computational efficiencies and time responsiveness. The computing nodes may be organized in a hierarchy. For instance, operations 902-910 may be performed at a first level of the hierarchy, whereas operations 912-920 may be performed at a second level of the hierarchy. Particularly, operations 912-920 may relatively necessitate larger processing and communication capabilities. Accordingly, the second hierarchical level may relatively be more computationally capable.

Figure 10:
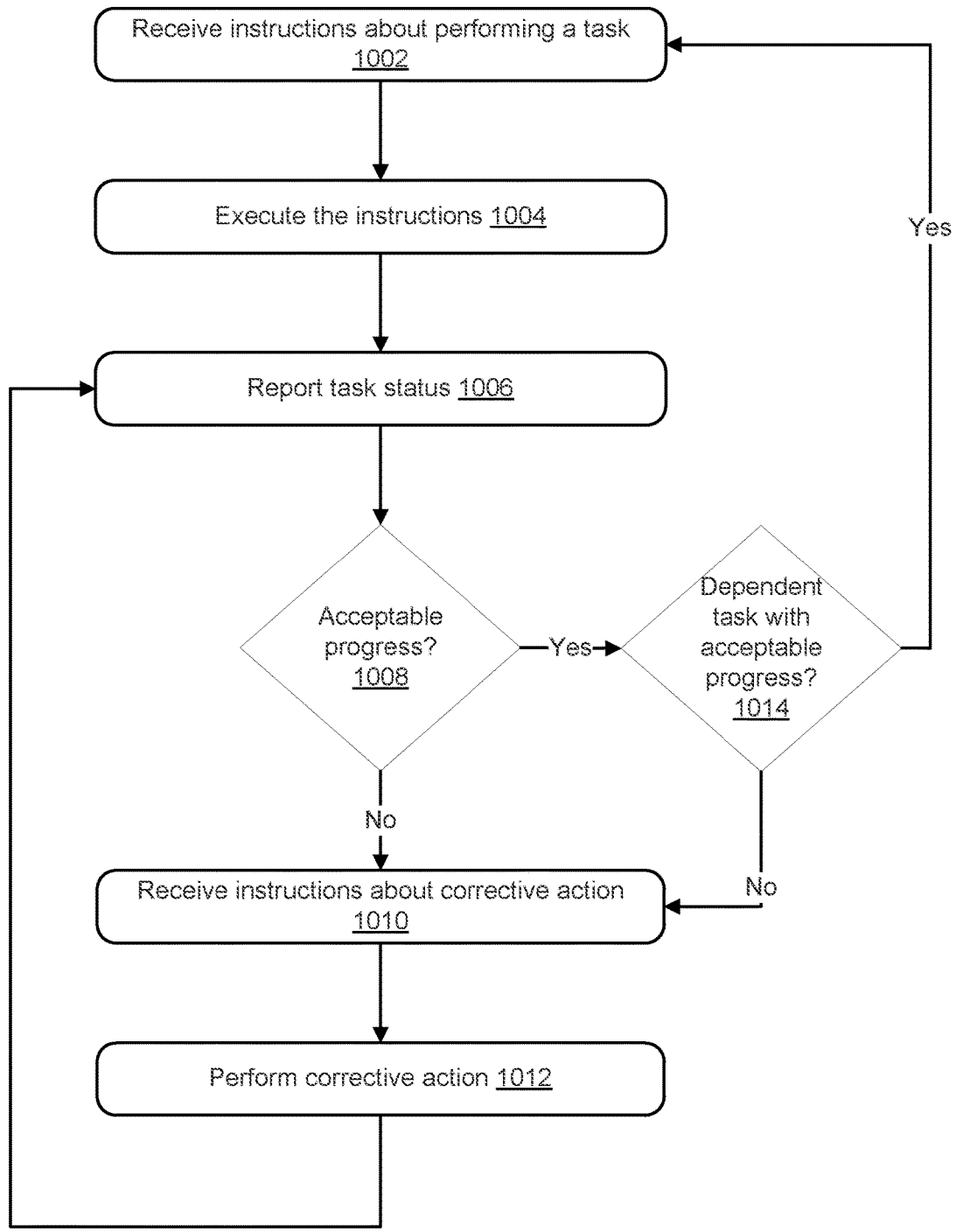
FIG. 10 illustrates an example flow for moving a robot within an arrangement of a macro robot, according to an embodiment of the present disclosure.

FIG. 10 illustrates an example flow for moving a robot within an arrangement of a macro robot. The robot is illustrated as performing some of the illustrative operations. The example flow may start at operation 1002, where the robot may receive instructions about performing a task. For example, the robot may receive the instructions from a local management system over a data network.

At operation 1004, the robot may execute the instructions. For example, upon receiving the instructions, a processor of the robot may execute the instructions and accordingly control various components of the robot to perform the task.

At operation 1006, the robot may report a status of the task. For example, the robot may report the status to the local management system over the data network at a particular monitoring rate that exceeds the rate at which the robot may receive instructions from the local management system.

At operation 1008, a determination (e.g., by the local management system) may be made as whether the progress of the task is acceptable (e.g., relative to external and internal tolerances). If not, operation 1010 may be performed to attempt a correction. Otherwise, operation 1014 may be performed.

At operation 1010, the robot may receive instructions about a corrective action. For example, the robot may receive these instructions from the local management system over the data network. The instructions may identify a new task (e.g., a new movement or a command to stop movement) or may reset the performance of the existing task.

At operation 1012, the robot may perform the corrective action. For example, the robot may execute the received instructions about the corrective action and may report the status of performing the corrective action by looping back to operation 1006.

At operation 1014, the progress of the existing task may be acceptable. However, a determination (e.g., by the local management system) as to whether another task may have an acceptable progress, where the other task may dependent from the existing task and performed by another robot. If so, operation 1002 may be performed again, where the robot may receive new instructions about a new task. To avoid deceleration, the new instructions may be received prior to the robot starting to decelerate. If the other task may not have a proper progress, operation 1010 may be performed, where the robot may receive instructions about a corrective action. In this case, the corrective action may depend on also the other task. For example, the corrective action may involve both robots re-performing their respective tasks.

Figure 11:
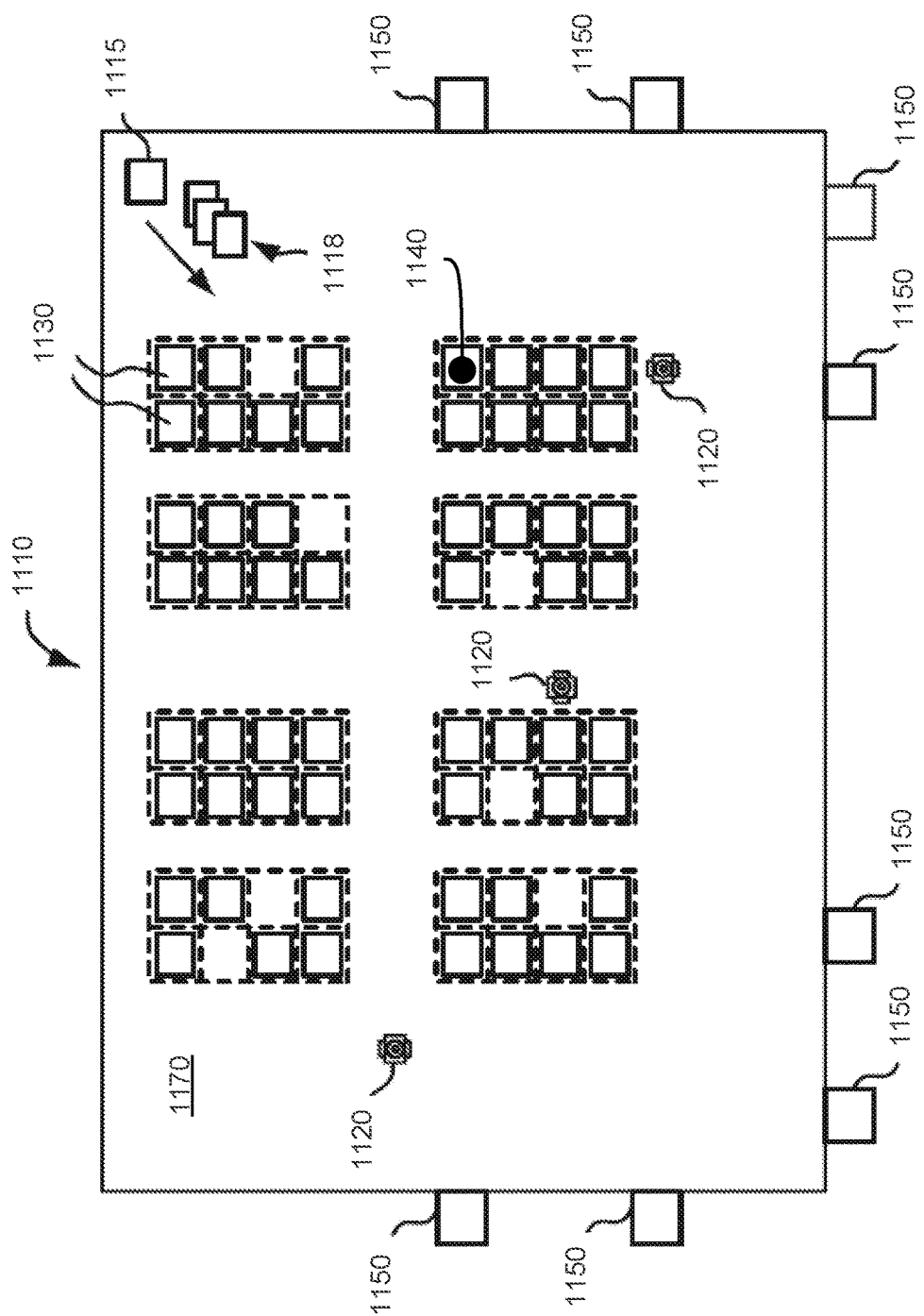
FIG. 11 illustrates example components of an inventory system, according to an embodiment of the present disclosure.

FIG. 11 illustrates the components of an inventory system 1110. Inventory system 1110 includes a management module 1115, mobile drive units 1120, one or more inventory holders 1130, and one or more inventory stations 1150. A mobile drive unit 1120 may be an example of a mobile robot. A group of the mobile drive units 1120 having a specific arrangement may be an example of a macro robot. Mobile drive units 1120 transport inventory holders 1130 between points within a workspace 1170 in response to commands communicated by management module 1115. Each inventory holder 1130 stores one or more types of inventory items. As a result, inventory system 1110 is capable of moving inventory items between locations within workspace 1170 to facilitate the entry, processing, and/or removal of inventory items from inventory system 1110 and the completion of other tasks involving inventory items.

Management module 1115 assigns tasks to appropriate components of inventory system 1110 and coordinates operation of the various components in completing the tasks. These tasks may relate not only to the movement and processing of inventory items, but also to the management and maintenance of the components of inventory system 1110. For example, management module 1115 may assign portions of workspace 1170 as parking spaces for mobile drive units 1120, the scheduled recharge or replacement of mobile drive unit batteries, the storage of empty inventory holders 1130, or any other operations associated with the functionality supported by inventory system 1110 and its various components. Management module 1115 may select components of inventory system 1110 to perform these tasks and communicate appropriate commands and/or data to the selected components to facilitate completion of these operations. Although shown in FIG. 11 as a single, discrete component, management module 1115 may represent multiple components and may represent or include portions of mobile drive units 1120 or other elements of inventory system 1110. As a result, any or all of the interactions between a particular mobile drive unit 1120 and management module 1115 that are described below may, in particular embodiments, represent peer-to-peer communication between that mobile drive unit 1120 and one or more other mobile drive units 1120. The components and operation of an example embodiment of management module 1115 are discussed further below with respect to FIG. 12.

Mobile drive units 1120 move inventory holders 1130 between locations within workspace 1170. Mobile drive units 1120 may represent any devices or components appropriate for use in inventory system 1110 based on the characteristics and configuration of inventory holders 1130 and/or other elements of inventory system 1110. In a particular embodiment of inventory system 1110, mobile drive units 1120 represent independent, self-powered devices configured to freely move about workspace 1170. Examples of such inventory systems are disclosed in U.S. Pat. No. 9,087,314, issued on Jul. 21, 112015, titled "SYSTEM AND METHOD FOR POSITIONING A MOBILE DRIVE UNIT" and U.S. Pat. No. 8,280,547, issued on Oct. 2, 112012, titled "METHOD AND SYSTEM FOR TRANSPORTING INVENTORY ITEMS", the entire disclosures of which are herein incorporated by reference. In alternative embodiments, mobile drive units 1120 represent elements of a tracked inventory system configured to move inventory holder 1130 along tracks, rails, cables, crane system, or other guidance or support elements traversing workspace 1170. In such an embodiment, mobile drive units 1120 may receive power and/or support through a connection to the guidance elements, such as a powered rail. Additionally, in particular embodiments of inventory system 1110 mobile drive units 1120 may be configured to utilize alternative conveyance equipment to move within workspace 1170 and/or between separate portions of workspace 1170. The components and operation of an example embodiment of a mobile drive unit 1120 are discussed further below with respect to FIG. 13.

Additionally, mobile drive units 1120 may be capable of communicating with management module 1115 to receive information identifying selected inventory holders 1130, transmit the locations of mobile drive units 1120, or exchange any other suitable information to be used by management module 1115 or mobile drive units 1120 during operation. Mobile drive units 1120 may communicate with management module 1115 wirelessly, using wired connections between mobile drive units 1120 and management module 1115, and/or in any other appropriate manner. As one example, particular embodiments of mobile drive unit 1120 may communicate with management module 1115 and/or with one another using 802.11, Bluetooth, or Infrared Data Association (IrDA) standards, or any other appropriate wireless communication protocol. As another example, in a tracked inventory system 1110, tracks or other guidance elements upon which mobile drive units 1120 move may be wired to facilitate communication between mobile drive units 1120 and other components of inventory system 1110. Furthermore, as noted above, management module 1115 may include components of individual mobile drive units 1120. Thus, for the purposes of this description and the claims that follow, communication between management module 1115 and a particular mobile drive unit 1120 may represent communication between components of a particular mobile drive unit 1120. In general, mobile drive units 1120 may be powered, propelled, and controlled in any manner appropriate based on the configuration and characteristics of inventory system 1110.

Inventory holders 1130 store inventory items. In a particular embodiment, inventory holders 1130 include multiple storage bins with each storage bin capable of holding one or more types of inventory items. Inventory holders 1130 are capable of being carried, rolled, and/or otherwise moved by mobile drive units 1120. In particular embodiments, inventory holder 1130 may provide additional propulsion to supplement that provided by mobile drive unit 1120 when moving inventory holder 1130.

Additionally, in particular embodiments, inventory items 1140 may also hang from hooks or bars (not shown) within or on inventory holder 1130. In general, inventory holder 1130 may store inventory items 1140 in any appropriate manner within inventory holder 1130 and/or on the external surface of inventory holder 1130.

Additionally, each inventory holder 1130 may include a plurality of faces, and each bin may be accessible through one or more faces of the inventory holder 1130. For example, in a particular embodiment, inventory holder 1130 includes four faces. In such an embodiment, bins located at a corner of two faces may be accessible through either of those two faces, while each of the other bins is accessible through an opening in one of the four faces. Mobile drive unit 1120 may be configured to rotate inventory holder 1130 at appropriate times to present a particular face and the bins associated with that face to an operator or other components of inventory system 1110.

Inventory items represent any objects suitable for storage, retrieval, and/or processing in an automated inventory system 1110. For the purposes of this description, "inventory items" may represent any one or more objects of a particular type that are stored in inventory system 1110. Thus, a particular inventory holder 1130 is currently "storing" a particular inventory item if the inventory holder 1130 currently holds one or more units of that type. As one example, inventory system 1110 may represent a mail order warehouse facility, and inventory items may represent merchandise stored in the warehouse facility. During operation, mobile drive units 2110 may retrieve inventory holders 1130 containing one or more inventory items requested in an order to be packed for delivery to a customer or inventory holders 1130 carrying pallets containing aggregated collections of inventory items for shipment. Moreover, in particular embodiments of inventory system 1110, boxes containing completed orders may themselves represent inventory items.

In particular embodiments, inventory system 1110 may also include one or more inventory stations 1150. Inventory stations 1150 represent locations designated for the completion of particular tasks involving inventory items. Such tasks may include the removal of inventory items from inventory holders 1130, the introduction of inventory items into inventory holders 1130, the counting of inventory items in inventory holders 1130, the decomposition of inventory items (e.g. from pallet- or case-sized groups to individual inventory items), the consolidation of inventory items between inventory holders 1130, and/or the processing or handling of inventory items in any other suitable manner. In particular embodiments, inventory stations 1150 may just represent the physical locations where a particular task involving inventory items can be completed within workspace 1170. In alternative embodiments, inventory stations 1150 may represent both the physical location and also any appropriate equipment for processing or handling inventory items, such as scanners for monitoring the flow of inventory items in and out of inventory system 1110, communication interfaces for communicating with management module 1115, and/or any other suitable components. Inventory stations 1150 may be controlled, entirely or in part, by human operators or may be fully automated. Moreover, the human or automated operators of inventory stations 1150 may be capable of performing certain tasks to inventory items, such as packing, counting, or transferring inventory items, as part of the operation of inventory system 1110.

Workspace 1170 represents an area associated with inventory system 1110 in which mobile drive units 1120 can move and/or inventory holders 1130 can be stored. For example, workspace 1170 may represent all or part of the floor of a mail-order warehouse in which inventory system 1110 operates. Although FIG. 11 shows, for the purposes of illustration, an embodiment of inventory system 1110 in which workspace 1170 includes a fixed, predetermined, and finite physical space, particular embodiments of inventory system 1110 may include mobile drive units 1120 and inventory holders 1130 that are configured to operate within a workspace 1170 that is of variable dimensions and/or an arbitrary geometry. While FIG. 11 illustrates a particular embodiment of inventory system 1110 in which workspace 1170 is entirely enclosed in a building, alternative embodiments may utilize workspaces 1170 in which some or all of the workspace 1170 is located outdoors, within a vehicle (such as a cargo ship), or otherwise unconstrained by any fixed structure.

In operation, management module 1115 selects appropriate components to complete particular tasks and transmits task assignments 1118 to the selected components to trigger completion of the relevant tasks. Each task assignment 1118 defines one or more tasks to be completed by a particular component. These tasks may relate to the retrieval, storage, replenishment, and counting of inventory items and/or the management of mobile drive units 1120, inventory holders 1130, inventory stations 1150 and other components of inventory system 1110. Depending on the component and the task to be completed, a particular task assignment 1118 may identify locations, components, and/or actions associated with the corresponding task and/or any other appropriate information to be used by the relevant component in completing the assigned task.

In particular embodiments, management module 1115 generates task assignments 1118 based, in part, on inventory requests that management module 1115 receives from other components of inventory system 1110 and/or from external components in communication with management module 1115. These inventory requests identify particular operations to be completed involving inventory items stored or to be stored within inventory system 1110 and may represent communication of any suitable form. For example, in particular embodiments, an inventory request may represent a shipping order specifying particular inventory items that have been purchased by a customer and that are to be retrieved from inventory system 1110 for shipment to the customer. Management module 1115 may also generate task assignments 1118 independently of such inventory requests, as part of the overall management and maintenance of inventory system 1110. For example, management module 1115 may generate task assignments 1118 in response to the occurrence of a particular event (e.g., in response to a mobile drive unit 1120 requesting a space to park), according to a predetermined schedule (e.g., as part of a daily start-up routine), or at any appropriate time based on the configuration and characteristics of inventory system 1110. After generating one or more task assignments 1118, management module 1115 transmits the generated task assignments 1118 to appropriate components for completion of the corresponding task. The relevant components then execute their assigned tasks.

With respect to mobile drive units 1120 specifically, management module 1115 may, in particular embodiments, communicate task assignments 1118 to selected mobile drive units 1120 that identify one or more destinations for the selected mobile drive units 1120. Management module 1115 may select a mobile drive unit 1120 to assign the relevant task based on the location or state of the selected mobile drive unit 1120, an indication that the selected mobile drive unit 1120 has completed a previously-assigned task, a predetermined schedule, and/or any other suitable consideration. These destinations may be associated with an inventory request the management module 1115 is executing or a management objective the management module 1115 is attempting to fulfill. For example, the task assignment may define the location of an inventory holder 1130 to be retrieved, an inventory station 1150 to be visited, a storage location where the mobile drive unit 1120 should park until receiving another task, or a location associated with any other task appropriate based on the configuration, characteristics, and/or state of inventory system 1110, as a whole, or individual components of inventory system 1110. For example, in particular embodiments, such decisions may be based on the popularity of particular inventory items, the staffing of a particular inventory station 1150, the tasks currently assigned to a particular mobile drive unit 1120, and/or any other appropriate considerations.

As part of completing these tasks mobile drive units 1120 may dock with and transport inventory holders 1130 within workspace 1170. Mobile drive units 1120 may dock with inventory holders 1130 by connecting to, lifting, and/or otherwise interacting with inventory holders 1130 in any other suitable manner so that, when docked, mobile drive units 1120 are coupled to and/or support inventory holders 1130 and can move inventory holders 1130 within workspace 1170. While the description below focuses on particular embodiments of mobile drive unit 1120 and inventory holder 1130 that are configured to dock in a particular manner, alternative embodiments of mobile drive unit 1120 and inventory holder 1130 may be configured to dock in any manner suitable to allow mobile drive unit 1120 to move inventory holder 1130 within workspace 1170. Additionally, as noted below, in particular embodiments, mobile drive units 1120 represent all or portions of inventory holders 1130. In such embodiments, mobile drive units 1120 may not dock with inventory holders 1130 before transporting inventory holders 1130 and/or mobile drive units 1120 may each remain continually docked with a particular inventory holder 1130.

While the appropriate components of inventory system 1110 complete assigned tasks, management module 1115 may interact with the relevant components to ensure the efficient use of space, equipment, manpower, and other resources available to inventory system 1110. As one specific example of such interaction, management module 1115 is responsible, in particular embodiments, for planning the paths mobile drive units 1120 take when moving within workspace 1170 and for allocating use of a particular portion of workspace 1170 to a particular mobile drive unit 1120 for purposes of completing an assigned task. In such embodiments, mobile drive units 1120 may, in response to being assigned a task, request a path to a particular destination associated with the task. Moreover, while the description below focuses on one or more embodiments in which mobile drive unit 1120 requests paths from management module 1115, mobile drive unit 1120 may, in alternative embodiments, generate its own paths.

Components of inventory system 1110 may provide information to management module 1115 regarding their current state, other components of inventory system 1110 with which they are interacting, and/or other conditions relevant to the operation of inventory system 1110. This may allow management module 1115 to utilize feedback from the relevant components to update algorithm parameters, adjust policies, or otherwise modify its decision-making to respond to changes in operating conditions or the occurrence of particular events.

In addition, while management module 1115 may be configured to manage various aspects of the operation of the components of inventory system 1110, in particular embodiments, the components themselves may also be responsible for decision-making relating to certain aspects of their operation, thereby reducing the processing load on management module 1115.

Thus, based on its knowledge of the location, current state, and/or other characteristics of the various components of inventory system 1110 and an awareness of all the tasks currently being completed, management module 1115 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 1110 may be able to support a number of techniques for efficiently executing various aspects of the operation of inventory system 1110. As a result, particular embodiments of management module 1115 may, by implementing one or more management techniques described below, enhance the efficiency of inventory system 1110 and/or provide other operational benefits.

While FIG. 11 illustrates a particular embodiment of mobile drive unit 1120 containing certain components and configured to operate in a particular manner, mobile drive unit 1120 may represent any appropriate component and/or collection of components configured to transport and/or facilitate the transport of inventory holders 1130. As another example, mobile drive unit 1120 may represent part of an overhead crane system in which one or more crane assemblies are capable of moving within a network of wires or rails to a position suitable to dock with a particular inventory holder 1130. After docking with inventory holder 1130, the crane assembly may then lift inventory holder 1130 and move inventory to another location for purposes of completing an assigned task.

Furthermore, in particular embodiments, mobile drive unit 1120 may represent all or a portion of inventory holder 1130. Inventory holder 1130 may include motorized wheels or any other components suitable to allow inventory holder 1130 to propel itself. As one specific example, a portion of inventory holder 1130 may be responsive to magnetic fields. Inventory system 1110 may be able to generate one or more controlled magnetic fields capable of propelling, maneuvering and/or otherwise controlling the position of inventory holder 1130 as a result of the responsive portion of inventory holder 1130. In such embodiments, mobile drive unit 1120 may represent the responsive portion of inventory holder 1130 and/or the components of inventory system 1110 responsible for generating and controlling these magnetic fields. While this description provides several specific examples, mobile drive unit 1120 may, in general, represent any appropriate component and/or collection of components configured to transport and/or facilitate the transport of inventory holders 1130.

Figure 12:
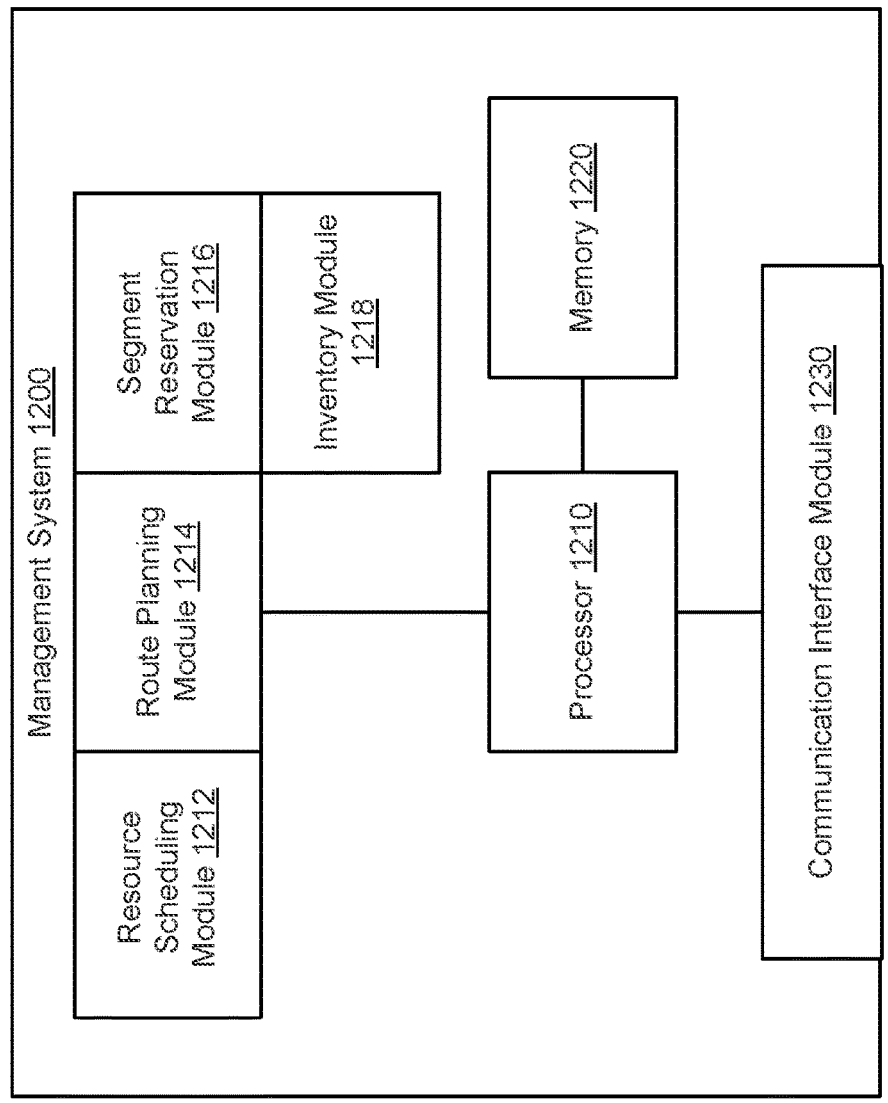
FIG. 12 illustrates example components of a management module implemented within an inventory system, according to an embodiment of the present disclosure.

FIG. 12 illustrates in greater detail the components of a particular embodiment of management module 1115. As shown, the example embodiment includes a resource scheduling module 1212, a route planning module 1214, a segment reservation module 1216, an inventory module 1218, a communication interface module 1230, a processor 1210, and a memory 1220. Management module 1115 may represent a single component, multiple components located at a central location within inventory system 1110, or multiple components distributed throughout inventory system 1110. For example, management module 1115 may represent components of one or more mobile drive units 1120 that are capable of communicating information between the mobile drive units 1120 and coordinating the movement of mobile drive units 1120 within workspace 1170. In general, management module 1115 may include any appropriate combination of hardware and/or software suitable to provide the described functionality.

Processor 1210 is operable to execute instructions associated with the functionality provided by management module 1115. Processor 1210 may comprise one or more general purpose computers, dedicated microprocessors, or other processing devices capable of communicating electronic information. Examples of processor 1210 include one or more application-specific integrated circuits (ASICs), field programmable gate arrays (FPGAs), digital signal processors (DSPs) and any other suitable specific or general purpose processors.

Memory 1220 stores processor instructions, inventory requests, reservation information, state information for the various components of inventory system 1110 and/or any other appropriate values, parameters, or information utilized by management module 1115 during operation. Memory 1220 may represent any collection and arrangement of volatile or nonvolatile, local or remote devices suitable for storing data. Examples of memory 1220 include, but are not limited to, random access memory (RAM) devices, read only memory (ROM) devices, magnetic storage devices, optical storage devices or any other suitable data storage devices.

Resource scheduling module 1212 processes received inventory requests and generates one or more assigned tasks to be completed by the components of inventory system 1110. Resource scheduling module 1212 may also select one or more appropriate components for completing the assigned tasks and, using communication interface module 1230, communicate the assigned tasks to the relevant components. Additionally, resource scheduling module 1212 may also be responsible for generating assigned tasks associated with various management operations, such as prompting mobile drive units 1120 to recharge batteries or have batteries replaced, instructing inactive mobile drive units 1120 to park in a location outside the anticipated traffic flow or a location near the anticipated site of future tasks, and/or directing mobile drive units 1120 selected for repair or maintenance to move towards a designated maintenance station.

Route planning module 1214 receives route requests from mobile drive units 1120. These route requests identify one or more destinations associated with a task the requesting mobile drive unit 1120 is executing. In response to receiving a route request, route planning module 1214 generates a path to one or more destinations identified in the route request. Route planning module 1214 may implement any appropriate algorithms utilizing any appropriate parameters, factors, and/or considerations to determine the appropriate path. After generating an appropriate path, route planning module 1214 transmits a route response identifying the generated path to the requesting mobile drive unit 1120 using communication interface module 1230.

Segment reservation module 1216 receives reservation requests from mobile drive units 1120 attempting to move along paths generated by route planning module 1214. These reservation requests request the use of a particular portion of workspace 1170 (referred to herein as a "segment") to allow the requesting mobile drive unit 1120 to avoid collisions with other mobile drive units 1120 while moving across the reserved segment. In response to received reservation requests, segment reservation module 1216 transmits a reservation response granting or denying the reservation request to the requesting mobile drive unit 1120 using the communication interface module 1230.

The inventory module 1218 maintains information about the location and number of inventory items 1140 in the inventory system 1110. Information can be maintained about the number of inventory items 1140 in a particular inventory holder 1130, and the maintained information can include the location of those inventory items 1140 in the inventory holder 1130. The inventory module 1218 can also communicate with the mobile drive units 1120, utilizing task assignments 1118 to maintain, replenish or move inventory items 1140 within the inventory system 1110.

Communication interface module 1230 facilitates communication between management module 1115 and other components of inventory system 1110, including reservation responses, reservation requests, route requests, route responses, and task assignments. These reservation responses, reservation requests, route requests, route responses, and task assignments may represent communication of any form appropriate based on the capabilities of management module 1115 and may include any suitable information. Depending on the configuration of management module 1115, communication interface module 1230 may be responsible for facilitating either or both of wired and wireless communication between management module 1115 and the various components of inventory system 1110. In particular embodiments, management module 1115 may communicate using communication protocols such as 802.11, Bluetooth, or Infrared Data Association (IrDA) standards. Furthermore, management module 1115 may, in particular embodiments, represent a portion of mobile drive unit 1120 or other components of inventory system 1110. In such embodiments, communication interface module 1230 may facilitate communication between management module 1115 and other parts of the same system component.

In general, resource scheduling module 1212, route planning module 1214, segment reservation module 1216, inventory module 1218, and communication interface module 1230 may each represent any appropriate hardware and/or software suitable to provide the described functionality. In addition, as noted above, management module 1115 may, in particular embodiments, represent multiple different discrete components and any or all of resource scheduling module 1212, route planning module 1214, segment reservation module 1216, inventory module 1218, and communication interface module 1230 may represent components physically separate from the remaining elements of management module 1115. Moreover, any two or more of resource scheduling module 1212, route planning module 1214, segment reservation module 1216, inventory module 1218, and communication interface module 1230 may share common components. For example, in particular embodiments, resource scheduling module 1212, route planning module 1214, segment reservation module 1216, and inventory module 1218 represent computer processes executing on processor 1210 and communication interface module 1230 comprises a wireless transmitter, a wireless receiver, and a related computer process executing on processor 1210.

Figure 13:
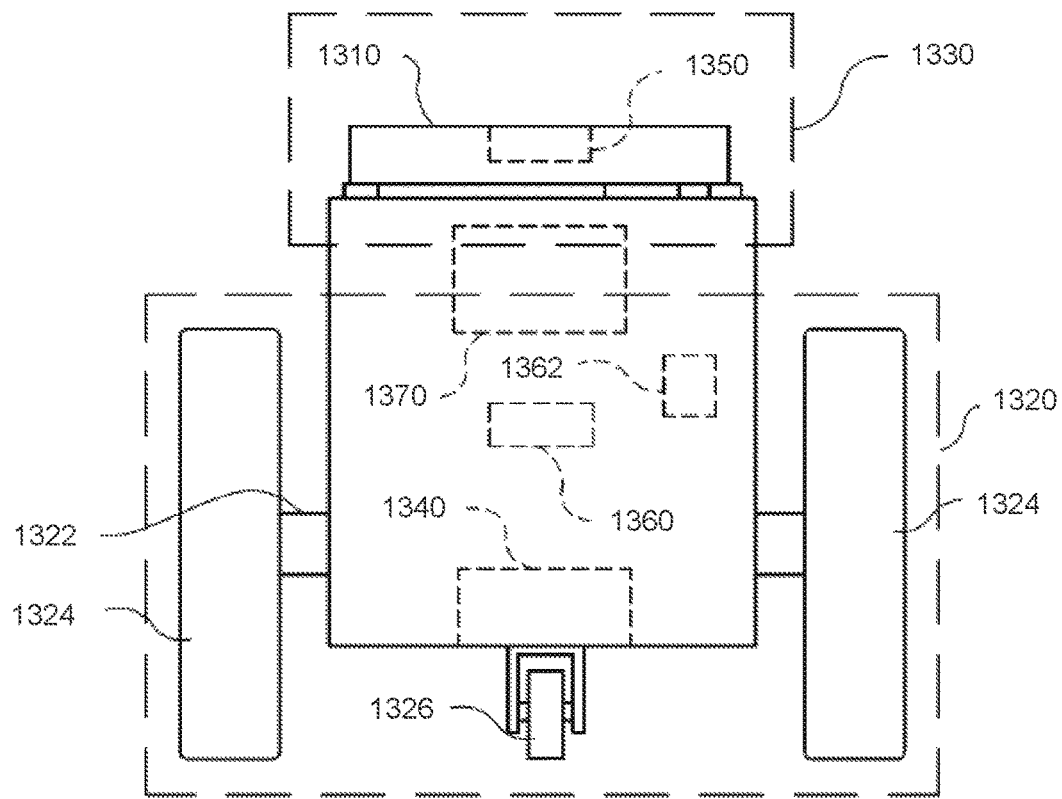
FIG. 13 illustrates example components of a robot, according to an embodiment of the present disclosure.

FIG. 13 illustrates in greater detail the components of a particular embodiment of mobile drive unit 1120. In particular, FIG. 13 includes a side view of an example mobile drive unit 1120. Mobile drive unit 1120 includes a docking head 1310, a drive module 1320, a docking actuator 1330, and a control module 1370. Additionally, mobile drive unit 1120 may include one or more sensors configured to detect or determine the location of mobile drive unit 1120, inventory holder 1130, and/or other appropriate elements of inventory system 1110. In the illustrated embodiment, mobile drive unit 1120 includes a position sensor 1340, a holder sensor 1350, an obstacle sensor 1360, and an identification signal transmitter 1362.

Docking head 1310, in particular embodiments of mobile drive unit 1120, couples mobile drive unit 1120 to inventory holder 1130 and/or supports inventory holder 1130 when mobile drive unit 1120 is docked to inventory holder 1130. Docking head 1310 may additionally allow mobile drive unit 1120 to maneuver inventory holder 1130, such as by lifting inventory holder 1130, propelling inventory holder 1130, rotating inventory holder 1130, and/or moving inventory holder 1130 in any other appropriate manner. Docking head 1310 may also include any appropriate combination of components, such as ribs, spikes, and/or corrugations, to facilitate such manipulation of inventory holder 1130. For example, in particular embodiments, docking head 1310 may include a high-friction portion that abuts a portion of inventory holder 1130 while mobile drive unit 1120 is docked to inventory holder 1130. In such embodiments, frictional forces created between the high-friction portion of docking head 1310 and a surface of inventory holder 1130 may induce translational and rotational movement in inventory holder 1130 when docking head 1310 moves and rotates, respectively. As a result, mobile drive unit 1120 may be able to manipulate inventory holder 1130 by moving or rotating docking head 1310, either independently or as a part of the movement of mobile drive unit 1120 as a whole.

Drive module 1320 propels mobile drive unit 1120 and, when mobile drive unit 1120 and inventory holder 1130 are docked, inventory holder 1130. Drive module 1320 may represent any appropriate collection of components operable to propel mobile drive unit 1120. For example, in the illustrated embodiment, drive module 1320 includes motorized axle 1322, a pair of motorized wheels 1324, and a pair of stabilizing wheels 1326. One motorized wheel 124 is located at each end of motorized axle 1322, and one stabilizing wheel 1326 is positioned at each end of mobile drive unit 1120.

Docking actuator 1330 moves docking head 1310 towards inventory holder 1130 to facilitate docking of mobile drive unit 1120 and inventory holder 1130. Docking actuator 1330 may also be capable of adjusting the position or orientation of docking head 1310 in other suitable manners to facilitate docking. Docking actuator 1330 may include any appropriate components, based on the configuration of mobile drive unit 1120 and inventory holder 1130, for moving docking head 1310 or otherwise adjusting the position or orientation of docking head 1310. For example, in the illustrated embodiment, docking actuator 1330 includes a motorized shaft (not shown) attached to the center of docking head 1310. The motorized shaft is operable to lift docking head 1310 as appropriate for docking with inventory holder 1130.

Drive module 1320 may be configured to propel mobile drive unit 1120 in any appropriate manner. For example, in the illustrated embodiment, motorized wheels 1324 are operable to rotate in a first direction to propel mobile drive unit 1120 in a forward direction. Motorized wheels 1324 are also operable to rotate in a second direction to propel mobile drive unit 1120 in a backward direction. In the illustrated embodiment, drive module 1320 is also configured to rotate mobile drive unit 1120 by rotating motorized wheels 1324 in different directions from one another or by rotating motorized wheels 1324 at different speeds from one another.

Position sensor 1340 represents one or more sensors, detectors, or other components suitable for determining the location of mobile drive unit 1120 in any appropriate manner. For example, in particular embodiments, the workspace 1170 associated with inventory system 1110 includes a number of fiducial marks that mark points on a two-dimensional grid that covers all or a portion of workspace 1170. In such embodiments, position sensor 1340 may include a camera and suitable image- and/or video-processing components, such as an appropriately-programmed digital signal processor, to allow position sensor 1340 to detect fiducial marks within the camera's field of view. Control module 1370 may store location information that position sensor 1340 updates as position sensor 1340 detects fiducial marks. As a result, position sensor 1340 may utilize fiducial marks to maintain an accurate indication of the location mobile drive unit 1120 and to aid in navigation when moving within workspace 1170.

Holder sensor 1350 represents one or more sensors, detectors, or other components suitable for detecting inventory holder 1130 and/or determining, in any appropriate manner, the location of inventory holder 1130, as an absolute location or as a position relative to mobile drive unit 1120. Holder sensor 1350 may be capable of detecting the location of a particular portion of inventory holder 1130 or inventory holder 1130 as a whole. Mobile drive unit 1120 may then use the detected information for docking with or otherwise interacting with inventory holder 1130.

Obstacle sensor 1360 represents one or more sensors capable of detecting objects located in one or more different directions in which mobile drive unit 1120 is capable of moving. Obstacle sensor 1360 may utilize any appropriate components and techniques, including optical, radar, sonar, pressure-sensing and/or other types of detection devices appropriate to detect objects located in the direction of travel of mobile drive unit 1120. In particular embodiments, obstacle sensor 1360 may transmit information describing objects it detects to control module 1370 to be used by control module 1370 to identify obstacles and to take appropriate remedial actions to prevent mobile drive unit 1120 from colliding with obstacles and/or other objects.

Obstacle sensor 1360 may also detect signals transmitted by other mobile drive units 1120 operating in the vicinity of the illustrated mobile drive unit 1120. For example, in particular embodiments of inventory system 1110, one or more mobile drive units 1120 may include an identification signal transmitter 1362 that transmits a drive identification signal. The drive identification signal indicates to other mobile drive units 1120 that the object transmitting the drive identification signal is in fact a mobile drive unit. Identification signal transmitter 1362 may be capable of transmitting infrared, ultraviolet, audio, visible light, radio, and/or other suitable signals that indicate to recipients that the transmitting device is a mobile drive unit 1120.

Additionally, in particular embodiments, obstacle sensor 1360 may also be capable of detecting state information transmitted by other mobile drive units 1120. For example, in particular embodiments, identification signal transmitter 1362 may be capable of including state information relating to mobile drive unit 1120 in the transmitted identification signal. This state information may include, but is not limited to, the position, velocity, direction, and the braking capabilities of the transmitting mobile drive unit 1120. In particular embodiments, mobile drive unit 1120 may use the state information transmitted by other mobile drive units to avoid collisions when operating in close proximity with those other mobile drive units.

Control module 1370 monitors and/or controls operation of drive module 1320 and docking actuator 1330. Control module 1370 may also receive information from sensors such as position sensor 1340 and holder sensor 1350 and adjust the operation of drive module 1320, docking actuator 1330, and/or other components of mobile drive unit 1120 based on this information. Additionally, in particular embodiments, mobile drive unit 1120 may be configured to communicate with a management device of inventory system 1110 and control module 1370 may receive commands transmitted to mobile drive unit 1120 and communicate information back to the management device utilizing appropriate communication components of mobile drive unit 1120. Control module 1370 may include any appropriate hardware and/or software suitable to provide the described functionality. In particular embodiments, control module 1370 includes a general-purpose microprocessor programmed to provide the described functionality. Additionally, control module 1370 may include all or portions of docking actuator 1330, drive module 1320, position sensor 1340, and/or holder sensor 1350, and/or share components with any of these elements of mobile drive unit 1120.

Moreover, in particular embodiments, control module 1370 may include hardware and software located in components that are physically distinct from the device that houses drive module 1320, docking actuator 1330, and/or the other components of mobile drive unit 1120 described above. For example, in particular embodiments, each mobile drive unit 1120 operating in inventory system 1110 may be associated with a software process (referred to here as a "drive agent") operating on a server that is in communication with the device that houses drive module 1320, docking actuator 1330, and other appropriate components of mobile drive unit 1120. This drive agent may be responsible for requesting and receiving tasks, requesting and receiving routes, transmitting state information associated with mobile drive unit 1120, and/or otherwise interacting with management module 1115 and other components of inventory system 1110 on behalf of the device that physically houses drive module 1320, docking actuator 1330, and the other appropriate components of mobile drive unit 1120. As a result, for the purposes of this description and the claims that follow, the term "mobile drive unit" includes software and/or hardware, such as agent processes, that provides the described functionality on behalf of mobile drive unit 1120 but that may be located in physically distinct devices from the drive module 1320, docking actuator 1330, and/or the other components of mobile drive unit 1120 described above.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
a plurality of mobile robots located within a storage facility and individually configured to move items within the storage facility;
one or more data networks;
one or more processors; and
one or more memories storing computer-readable instructions that, upon execution by the one or more processors, cause the inventory system to at least:
allocate, to a mobile robot group and based at least in part on an inventory-related action to move an item within the storage facility, mobile robots from the plurality of mobile robots, the mobile robot group configured to move the item from a first location to a second location of the storage facility based at least in part on an arrangement of the mobile robots within the mobile robot group;
reserve, to the mobile robot group, a path within the storage facility for moving the item from the first location to the second location;
generate tasks for incremental movement of the item by the mobile robot group along the path, each task associated with a mobile robot of the mobile robot group;
generate, based at least in part on the arrangement of the mobile robots within the mobile robot group, dependencies between the tasks;
send, to a first mobile robot of the mobile robot group over the one or more data networks, first instructions to incrementally move the item by the first mobile robot based at least in part on the arrangement of the mobile robots within the mobile robot group, the first instructions corresponding to a first task from the tasks;
receive, from the first mobile robot over the one or more data networks, first data indicating progress of incrementally moving the item based at least in part on the first instructions; and
send, to a second mobile robot of the mobile robot group over the one or more data networks, second instructions to incrementally move the item by the second mobile robot based at least in part on the arrangement of the mobile robots within the mobile robot group, the second instructions corresponding to a second task from the tasks and sent based at least in part on the first data and on dependency between the second task and the first task from the dependencies.

2. The inventory system of claim 1, wherein the one or more processors and the one or more memories are distributed between a first computer system and a second computer system at different hierarchies of a computer network, wherein the first computer system receives updates about progress of the incremental movement of the item at a first frequency from the second computer system, and wherein the second computer system receives updates about the incremental movement of the item from the mobile robots of the mobile robot group at a second frequency greater than the first frequency.

3. The inventory system of claim 2, wherein the mobile robot group is identified by the first computer system based at least in part on a size, shape, or weight of the item, wherein the path is reserved by a first computing node of the first computer system, and wherein the tasks are generated by a second computing node of the second computer system.

4. The inventory system of claim 1, wherein the first task initiates movement of the first mobile robot at a first acceleration, wherein the second task initiates movement of the second mobile robot at a second acceleration greater than the first acceleration, and wherein the computer-readable instructions further cause the inventory system to:
send, to the first mobile robot over the one or more data networks, third instructions to incrementally move the item by the first mobile robot, the third instructions corresponding to a third task from the tasks and sent prior to a deceleration of the first mobile robot based at least in part on dependency between the second task and the third task from the dependencies.

5. A computer-implemented method, comprising:
allocating, by one or more computer systems, a first mobile robot and a second mobile robot to a mobile robot group, the mobile robot group configured to move an item along a path;

generating, by at least one of the one or more computer systems and based at least in part on the path, a first task for the first mobile robot and a second task for the second mobile robot, the first task and the second task defining an incremental movement of the item by the mobile robot group along the path based at least in part on an arrangement of the first mobile robot and the second mobile robot within the mobile robot group;

generating, by at least one of the one or more computer systems and based at least in part on the arrangement of the first mobile robot and the second mobile robot within the mobile robot group, a dependency between the first task and the second task;

sending, by at least one of the one or more computer systems to the first mobile robot, first instructions to move the item, the first instructions corresponding to the first task;

receiving, by at least one of the one or more computer systems from the first mobile robot, first data indicating progress of the incremental movement based at least in part on the first instructions; and sending, by at least one of the one or more computer systems to the second mobile robot, second instructions to move the item, the second instructions corresponding to the second task and sent based at least in part on the first data and on the dependency between the first task and the second task.

6. The computer-implemented method of claim 5, wherein the first mobile robot and the second mobile robot are located within a storage facility, wherein the path is reserved for the mobile robot group based at least in part on an inventory-related action to move the item from a first location to a second location of the storage facility, and wherein the arrangement of the first mobile robot and the second mobile robot is maintained along the path.

7. The computer-implemented method of claim 5, wherein the dependency is based at least in part on a space tolerance that constrains relative movement of the first mobile robot and the second mobile robot within the arrangement to less than twenty-five millimeter, wherein the relative movement is based at least in part on the first task and the second task.

8. The computer-implemented method of claim 5, wherein the dependency is based at least in part a time tolerance that constrains relative timing between sending the first instructions and sending the second instructions to less than one millisecond.

9. The computer-implemented method of claim 5, further comprising:

generating first tasks for the first mobile robot to incrementally move the item, the first tasks comprising the first task;

sending, prior to initiating the incremental movement, instructions about the first tasks to the first mobile robot;

determining an update to one of the tasks based at least in part on movement by the second mobile robot; and sending the update to the first mobile robot.

10. The computer-implemented method of claim 5, further comprising:

generating a third task for the first mobile robot to incrementally move the item; and sending third instructions about the third task to the first mobile robot based at least in part on movement of the second mobile robot according to the second instructions.

11. The computer-implemented method of claim 10, wherein the third instructions are sent to the first mobile robot prior to a deceleration of the first mobile robot.

12. The computer-implemented method of claim 5, wherein the first mobile robot and the second mobile robot are allocated to the mobile robot group based at least in part on a mapping of the arrangement to an identifier of the item and an action to move the item, and based at least in part on a mapping of identifiers of the first mobile robot and the second mobile robot to statuses of the first mobile robot and the second mobile robot.

13. One or more computer-readable storage media comprising computer-readable instructions that, upon execution by one or more processors, cause an inventory system to perform operations comprising:

allocating a first mobile robot and a second mobile robot to a mobile robot group, the mobile robot group configured to move an item along a path based at least in part on an arrangement of the first mobile robot and the second mobile robot within the mobile robot group;

based at least in part on the path, generating a first task to incrementally move the item by the first mobile robot in the arrangement within the mobile robot group and generating a second task to incrementally move the item by the second mobile robot in the arrangement within the mobile robot group;

generating, based at least in part on the arrangement of the first mobile robot and the second mobile robot within the mobile robot group, a dependency between the first task and the second task;

sending, to the first mobile robot and based at least in part on the first task, first instructions to incrementally move the item by the first mobile robot in the arrangement within the mobile robot group;

receiving, from the first mobile robot, first data indicating progress of incrementally moving the item; and sending, to the second mobile robot, second instructions to incrementally move the item by the second mobile robot, the second instructions sent based at least in part on the first data and on the dependency between the first task and the second task.

14. The computer-readable storage medium of claim 13, wherein the computer system is configured to monitor progresses of inventory-related actions within a plurality of storage facilities.

15. The computer-readable storage medium of claim 13, wherein the operations further comprise: maintaining a status of the first mobile robot, wherein the status indicates at least one of: an allocation of the first mobile robot to the mobile robot group, an assignment to the first mobile robot to individually move another item, or an availability of the first robot to move items.

16. The computer-readable storage medium of claim 15, wherein the operations further comprise:

updating the status of the first mobile robot from the allocation to the mobile robot group to being available based at least in part on completing movement of the item along the path by the mobile robot group; and assigning the first mobile robot to individually move the other item based at least in part on the status being update to available.

17. The computer-readable storage medium of claim 13, wherein the operations further comprise: instructing the first mobile robot and the second mobile robot to move to respective positions within a staging area, wherein the respective positions correspond to the arrangement within the mobile robot group and are based at least in part on a positioning resolution of the staging area.

18. The computer-readable storage medium of claim 13, wherein the dependency constrains relative timing between sending the first instructions and sending the second instructions to less than a time interval, and wherein the first data is received from the first mobile robot at a periodic time interval smaller than the time interval.

19. The computer-readable storage medium of claim 13, wherein the operations further comprise:
   receiving, from the second mobile robot, second data indicating failure of incrementally moving the item; and
   sending, to the first mobile robot and second mobile robot, instructions to initiate a first corrective action, the first corrective action comprises at least one of: moving the item to a ground position, or re-executing the first instructions and the second instructions based at least in part on the dependency between the first task and the second task.

20. The computer-readable storage medium of claim 19, wherein the operations further comprise:
   determining that a number of the failure exceeds a threshold number; and
   initiating a second corrective action based at least in part on the number of the failure exceeding the threshold number, the second corrective action comprises forming a new arrangement of mobile robots to move the item.

* * * * *